US011491372B2

(12) United States Patent
Ida et al.

(10) Patent No.: US 11,491,372 B2
(45) Date of Patent: Nov. 8, 2022

(54) INFORMATION PROCESSING DEVICE, INFORMATION PROCESSING METHOD, AND COMPUTER PROGRAM

(71) Applicant: SONY CORPORATION, Tokyo (JP)

(72) Inventors: Kentaro Ida, Tokyo (JP); Fumihiko Iida, Kanagawa (JP); Takuya Ikeda, Tokyo (JP); Yoshihito Ohki, Tokyo (JP); Miho Yamada, Saitama (JP)

(73) Assignee: SONY CORPORATION, Tokyo (JP)

( * ) Notice: Subject to any disclaimer, the term of this patent is extended or adjusted under 35 U.S.C. 154(b) by 84 days.

(21) Appl. No.: 16/977,354

(22) PCT Filed: Jan. 29, 2019

(86) PCT No.: PCT/JP2019/002860
§ 371 (c)(1),
(2) Date: Sep. 1, 2020

(87) PCT Pub. No.: WO2019/171830
PCT Pub. Date: Sep. 12, 2019

(65) Prior Publication Data
US 2021/0106871 A1    Apr. 15, 2021

(30) Foreign Application Priority Data

Mar. 8, 2018 (JP) .............................. JP2018-041392

(51) Int. Cl.
A63B 24/00 (2006.01)
A63F 7/06 (2006.01)

(52) U.S. Cl.
CPC ...... *A63B 24/0021* (2013.01); *A63B 24/0006* (2013.01); *A63F 7/0632* (2013.01); *A63F 7/0664* (2013.01); *A63B 2024/0028* (2013.01); *A63B 2024/0053* (2013.01)

(58) Field of Classification Search
CPC ............ A63B 24/0021; A63B 24/0006; A63B 2024/0028; A63B 2024/0053; A63F 7/0632; A63F 7/0664
See application file for complete search history.

(56) References Cited

U.S. PATENT DOCUMENTS

2010/0302171 A1* 12/2010 Yoshida ................ G06F 3/0321
345/173
2011/0021256 A1    1/2011 Lundback et al.

FOREIGN PATENT DOCUMENTS

JP      2008-086744 A    4/2008
JP      2012-029750 A    2/2012
WO   WO 2016/092656 A1   6/2016

* cited by examiner

Primary Examiner — Werner G Garner
(74) Attorney, Agent, or Firm — Paratus Law Group, PLLC

(57) ABSTRACT

There is provided an information processing device, an information processing method, and a computer program capable of more reliably recognizing positions of a plurality of detection targets. The information processing device includes a control unit for recognizing positions of a first detection target and a second detection target that are present on the same surface. The control unit recognizes the position of the first detection target based on sensing data obtained by a first sensor for sensing the first detection target from a first direction, and recognizes the position of the second detection target based on sensing data obtained by a second sensor for sensing the second detection target from a direction opposite to the first direction across the same surface.

19 Claims, 20 Drawing Sheets

INFORMATION PROCESSING DEVICE, INFORMATION PROCESSING METHOD, AND COMPUTER PROGRAM

CROSS REFERENCE TO PRIOR APPLICATION

This application is a National Stage Patent Application of PCT International Patent Application No. PCT/JP2019/002860 (filed on Jan. 29, 2019) under 35 U.S.C. § 371, which claims priority to Japanese Patent Application No. 2018-041392 (filed on Mar. 8, 2018), which are all hereby incorporated by reference in their entirety.

FIELD

The present disclosure relates to an information processing device, an information processing method, and a computer program.

BACKGROUND

Conventionally, an object detection method using infrared light has been known as a method for recognizing an object in a space. As an example of the object method using infrared light, in recent years, the presence of an object has been detected from depth distance information (depth map).

A motion capture system for capturing motion by attaching retroreflective markers to the body has been known.

For example, Patent Literature 1 below discloses a system for recognizing a marker of a target and projecting an image on the target by projection.

CITATION LIST

Patent Literature

Patent Literature 1: JP 2015-90524 A

SUMMARY

Technical Problem

In the conventional methods, however, there is a high possibility that a target is erroneously recognized or a target is lost when a plurality of markers are close to an object.

Therefore, the present disclosure proposes an information processing device, an information processing method, and a computer program capable of more reliably recognizing the positions of a plurality of detection targets.

Solution to Problem

According to the present disclosure, an information processing device is provided that includes a control unit for recognizing positions of a first detection target and a second detection target that are present on the same surface, wherein the control unit is configured to: recognize the position of the first detection target based on sensing data obtained by a first sensor for sensing the first detection target from a first direction; and recognize the position of the second detection target based on sensing data obtained by a second sensor for sensing the second detection target from a direction opposite to the first direction across the same surface.

Moreover, according to the present disclosure, an information processing method is provided that includes: recognizing, by a processor, a position of a first detection target based on sensing data obtained by a first sensor for sensing the first detection target from a first direction; and recognizing, by the processor, a position of a second detection target based on sensing data obtained by a second sensor for sensing the second detection target present on a surface on which the first detection target is present from a direction opposite to the first direction across the surface.

Moreover, according to the present disclosure, a computer program is provided that causes a computer to function as a control unit for recognizing positions of a first detection target and a second detection target that are present on the same surface, wherein the control unit is configured to: recognize the position of the first detection target based on sensing data obtained by a first sensor for sensing the first detection target from a first direction; and recognize the position of the second detection target based on sensing data obtained by a second sensor for sensing the second detection target from a direction opposite to the first direction across the same surface.

Advantageous Effects of Invention

As described above, according to the present disclosure, the positions of a plurality of detection targets can be more reliably recognized.

Note that the above-mentioned effect is not necessarily limited, and any effect disclosed herein or other effects that could be understood from the specification may be exhibited together with or in place of the above-mentioned effect.

DESCRIPTION OF EMBODIMENTS

Figure 1:
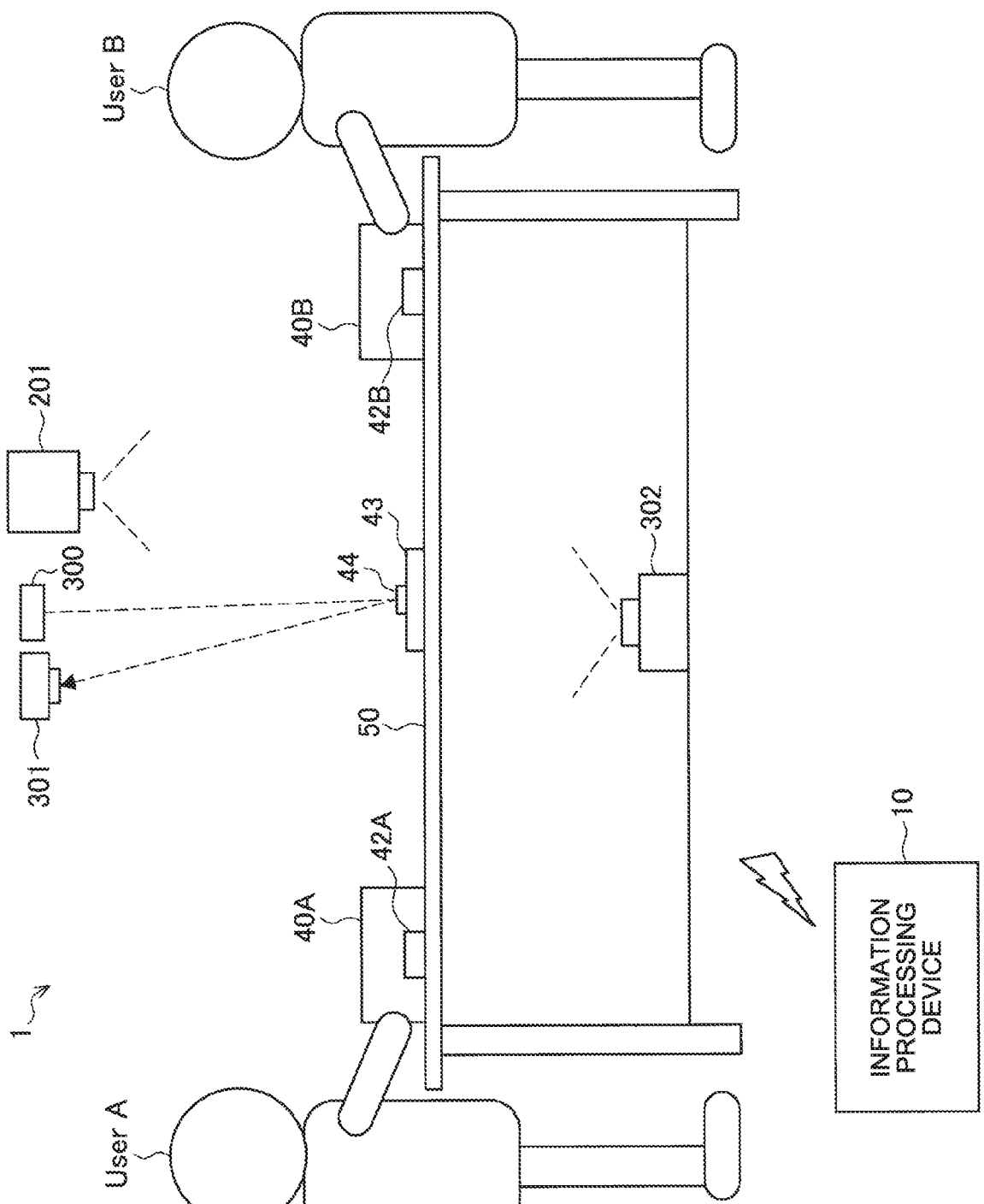
FIG. 1 is a diagram for describing the outline of an information processing system according to one embodiment of the present disclosure.

Referring to the accompanying drawings, exemplary embodiments of the present disclosure are described in detail below. Note that, in the specification and the drawings, components having substantially the same functional configurations are denoted by the same reference symbols to omit overlapping descriptions.

The description is made in the following order:
1. Outline of information processing system according to one embodiment of present disclosure
2. Configuration example
2-1. Output device 20
2-2. Input device 30
2-3. Information processing device 10
3. Operation processing
4. Interaction example
4-1. Interaction corresponding to collision between puck 43 and mallet 40
4-2. Interaction corresponding to collision between puck 43 and outer peripheral wall
4-3. Feedback corresponding to collision in virtual size of puck 43/mallet 40
4-4. Feedback corresponding to collision of virtual puck
4-5. Recording of board surface image
4-6. Flow of interaction control processing
5. Application example
5-1. Position detection of person in room
5-2. Detection of position and front/back side of card in card game
5-3. Application to bouldering
6. Hardware configuration example
7. Conclusion

1. Outline of Information Processing System According to One Embodiment of Present Disclosure FIG. 1 is a diagram for describing the outline of an information processing system according to one embodiment of the present disclosure. As illustrated in FIG. 1, for example, the case where an information processing system 1 according to the present embodiment is applied to air hockey as an example of technology for identifying and detecting two types of detection targets on the same surface without erroneous recognition and tracking is described.

Air hockey is a playgame where users grip instruments called mallets (hereinafter referred to as "mallets 40") and hit a disc called puck (hereinafter referred to as "puck 43") made of plastic on a board. The puck 43 floats by air ejected on the board surface.

As illustrated in FIG. 1, the information processing system 1 according to the present embodiment includes a top camera 301 for detecting a puck 43 on a board of a hockey table 50, a bottom camera 302 for detecting mallets 40 (mallets 40A and 40B) on the same surface as the puck 43, and an information processing device 10 for performing processing for detecting the positions of the puck 43 and the mallets 40 based on an image taken by the top camera 301 and an image taken by the bottom camera 302. For example, the puck 43 is an example of a first detection target, the mallet 40 is an example of a second detection target, the top camera 301 is an example of a first sensor, and the bottom camera 302 is an example of a second sensor. The hockey table 50 is an example of a member that forms a surface on which the first detection target and the second detection target are located.

The information processing system 1 further includes a projector 201 for projecting video on the board of the hockey table 50, and the information processing device 10 can control the projection by the projector 201 in accordance with results of position detection of the puck 43 and the mallets 40.

Background

As described above, for example, in a system for detecting a marker of a detection target to recognize an object, when a plurality of detection targets are to be recognized, there is a problem in that an object is erroneously recognized or a detection target is lost. Specifically, for example, as illustrated in the left side of FIG. 2, in the case where moving markers 801 and 802 are detected from a taken image 800 acquired by a camera for detecting markers attached to detection targets, and the positions of the detection target are tracked, when the markers 801 and 802 are close to each other, the two close markers seem to be one (two markers are connected and recognized as one integrated marker 811) as indicated by a taken image 810 in the middle of FIG. 2. In this case, as illustrated in the right side of FIG. 2, it is unknown whether the markers have collided with each other (recognition result 820a in FIG. 2) or the markers have passed by each other (see recognition result 820b in FIG. 2), and erroneous recognition or losing of detection targets occurs.

In particular, when applied to air hockey illustrated in FIG. 1, the puck and the mallets need to be more reliably recognized and tracked in consideration that the mallet gripped by users and the puck to be hit are recognized and projection mapping is performed at the moment at which the puck and the mallet collide or as needed on the moving puck. In the conventional technology, there is a high possibility that recognition is replaced at the moment at which the mallet and the puck collide or any one of the mallet and the puck is lost, which is a cause to hinder user's experience.

Therefore, the present embodiment proposes a mechanism capable of more reliably recognizing the positions of a plurality of detection targets.

Specifically, the information processing system 1 according to the present embodiment separates sensors for sensing various kinds of detection targets, and uses data obtained by sensing from two directions of the top surface and the bottom surface of the board surface, thereby being capable of preventing erroneous recognition. For example, in the example of the application to air hockey illustrated in FIG. 1, a camera for imaging the puck 43 and the mallets 40 is separated into a top camera 301 and a bottom camera 302 and disposed on the top surface side and the bottom surface side of the hockey table 50 as illustrated in FIG. 1. In this manner, the top camera 301 images a first detection target (for example, puck 43) from the top surface side of the hockey table 50, and the bottom camera 302 images a second detection target (for example, mallet 40) from the bottom surface side of the hockey table 50. By sensing the two types of detection targets from the two directions and detecting the positions by using taken images as sensing data from the two directions, the mixing and erroneous recognition of the positions of the puck 43 and the mallets 40 can be prevented.

By applying this method, this method can be used for detection whether a marker attached to a detection target is arbitrarily covered with a hand and the detection target is gripped.

An example of the application to air hockey illustrated in FIG. 1 is described in more detail. The top panel of the hockey table 50 is formed from a member that transmits at least a wavelength (detection wavelength) emitted from a light emitting element 42. For example, when the light emitting element 42 is implemented by an IR LED, the top panel of the hockey table 50 is constructed by an acrylic plate that transmits IR light. By forming the top panel of the hockey table 50 from a member that does not transmit visible light, video can be projected from the projector 201 onto the top panel (board surface) of the hockey table 50. An upward camera (bottom camera 302) for imaging the top panel of the hockey table 50 from the lower side is installed inside the hockey table 50. On the top of the top panel, a downward camera (top camera 301) for imaging the top panel of the hockey table 50 from the upper side is installed in the ceiling-mounted state.

The puck 43, which is one of a plurality of types of detection targets, is provided with a reflection material 44 on its top surface, and is detected by the top camera 301 set above the puck 43. For example, the reflection material 44 may be a retroreflective marker. The retroreflective marker is a marker having characteristics to strongly reflect light to a direction in which the light has come. By installing a projector (illumination device 300) on the side of the camera (top camera 301), light from the illumination device 300 can be returned strongly as reflection light to the direction of the top camera 301 located next to the illumination device 300. The illumination device 300 may be an IR illumination device. The top camera 301 may be provided with a visible light cut filter. In one example, the reflection material 44 is bonded to the puck 43, but a light emitting element may be provided thereto. However, the puck 43 used in air hockey is caused to float by air ejected on the board surface, and is preferably implemented by a light puck in a wireless manner, and hence the reflection material 44 such as a retroreflective marker is more appropriate than a light emitting element such as an IR LED requiring power.

The mallet 40, which is one of a plurality of types of detection targets, is mounted with a light emitting element 42 on its bottom surface, and is detected by the bottom camera 302 installed below the mallet 40. For example, the light emitting element 42 may be an LED (IR LED) that emits IR light. A plurality of the mallets 40 may be provided. The mallet 40 and the puck 43 are present on the same surface on the top panel of the hockey table 50. As described above, the top panel of the hockey table 50 is formed by a member that transmits a wavelength emitted from the light emitting element 42, and hence emission from the light emitting element 42 mounted to the bottom surface of the mallet 40 placed on the top panel can be imaged by the bottom camera 302 from below through the top panel of the hockey table 50.

Note that the case where the light emitting element 42 made of an IR LED is mounted on the mallet 40 has been described as an example, but the present embodiment is not limited thereto. Similarly to the detection method for the puck 43, a method in which a reflection material such as a retroreflective marker is provided to the mallet 40 and a projector (illumination device) is installed next to the bottom camera 302 may be used.

The information processing system according to one embodiment of the present disclosure has been described above. Subsequently, the specific configuration of each device included in the information processing system according to the present embodiment is described with reference to the drawings.

2. Configuration Example

Figure 3:
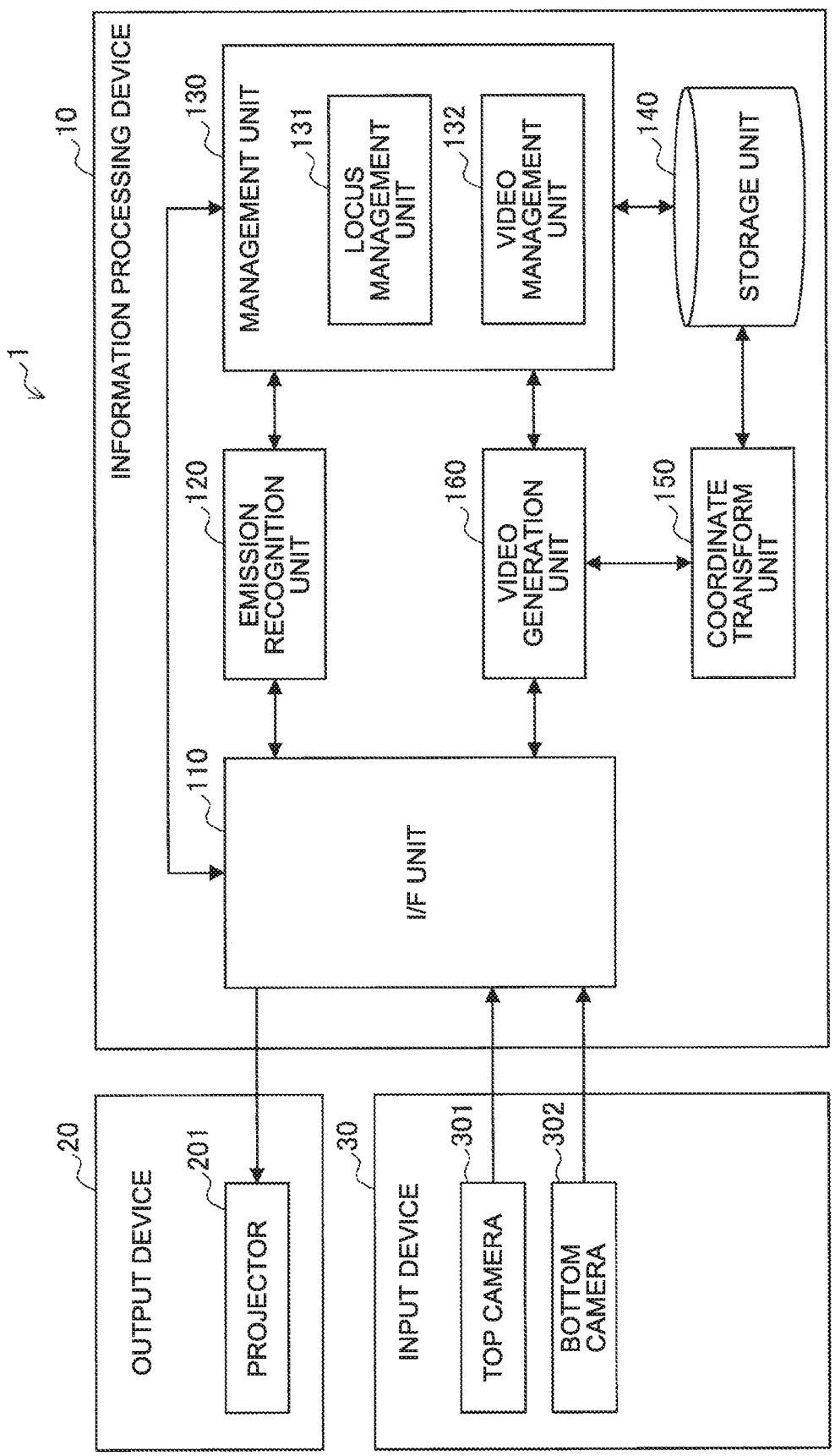
FIG. 3 is a block diagram illustrating an example of a configuration of an information processing device according to the present embodiment.

FIG. 3 is a block diagram illustrating an example of the configuration of the information processing system 1 according to the present embodiment. As illustrated in FIG. 3, the information processing system 1 includes an information processing device 10, an output device 20, and an input device 30.

2-1. Output Device 20

The output device 20 has a function for outputting output information such as voice and images under control of the information processing device 10. For example, the output device 20 may project output information (such as video) on the hockey table 50 by the projector 201 as illustrated in FIG. 1. When a display (not shown) is provided on the entire surface of the hockey table 50 or around the hockey table 50, the output device 20 may display output information (such as video) on the display. The output device 20 may output voice from an acoustic device (not shown) installed around the hockey table 50.

2-2. Input Device 30

The input device 30 is a sensor for sensing a detection target, and outputs sensing data to the information processing device 10. For example, the input device 30 includes a top camera 301 and a bottom camera 302. As illustrated in FIG. 1, the top camera 301 has a function for imaging the hockey table from the above and detecting IR light emitted from the illumination device 300 such as an IR projector and reflected by the reflection material 44 of the puck 43. The top camera 301 may be provided with a visible light filter. The bottom camera 302 has a function for imaging the hockey table from the bottom and detecting emission from the light emitting element 42 provided on the bottom surface of the mallet 40.

2-3. Information Processing Device 10

As illustrated in FIG. 3, the information processing device 10 includes an I/F unit 110, an emission recognition unit 120, a management unit 130, a storage unit 140, a coordinate transform unit 150, and a video generation unit 160. The management unit 130 functions as a locus management unit 131 and a video management unit 132.

Sensing data acquired by the input device 30 (specifically, images taken by top camera 301 and bottom camera 302) is transmitted to the emission recognition unit 120 through the I/F unit 110. For example, the I/F unit 110 may be connected to external devices such as the output device 20 and the input device 30 by wired or wireless connection to transmit and receive data. The I/F unit 110 can be connected to the Internet. For example, the I/F unit 110 is communicably connected to external devices by wired/wireless local area network (LAN), Wi-Fi (trademark), Bluetooth (trademark), mobile communication network (long term evolution (LTE), or 3G (third generation mobile communication scheme))).

The emission recognition unit 120 detects a bright spot from a taken image, and transmits coordinates of the detected bright spot to the locus management unit 131 in the management unit 130. The emission recognition unit 120 has a function for tracking the movement of the detected bright spot to acquire a locus of the bright spot. For example, the emission recognition unit 120 acquires a locus of the puck 43 from a taken image acquired by the top camera 301 (tracking of position of puck 43).

The locus management unit 131 stores a history of the locus acquired by the emission recognition unit 120 in the storage unit 140, and manages the locus.

The video management unit 132 manages contents such as data on projection mapping on the top panel of the hockey table 50 in accordance with the acquired locus. For example, in response to a request from the video generation unit 160, the video management unit 132 acquires a predetermined image object from the storage unit 140 or an external device, and outputs the image object to the video generation unit 160.

In response to a request from the video generation unit 160, the coordinate transform unit 150 invokes information on a target locus from the storage unit 140, calculates coordinates to display video for the target from the information on the locus, and outputs the calculated coordinates to the video generation unit 160.

The video generation unit 160 generates video for performing projection mapping in accordance with the locus of the puck 43 or the like. Specifically, based on an image object acquired from the video management unit 132 and coordinates to display video for the target that have been acquired from the coordinate transform unit 150, the video generation unit 160 generates video for projecting an image object in accordance with the coordinates. The generated video is transmitted to the projector 201 through the I/F unit 110, and projected on the top panel of the hockey table 50.

Figure 4:
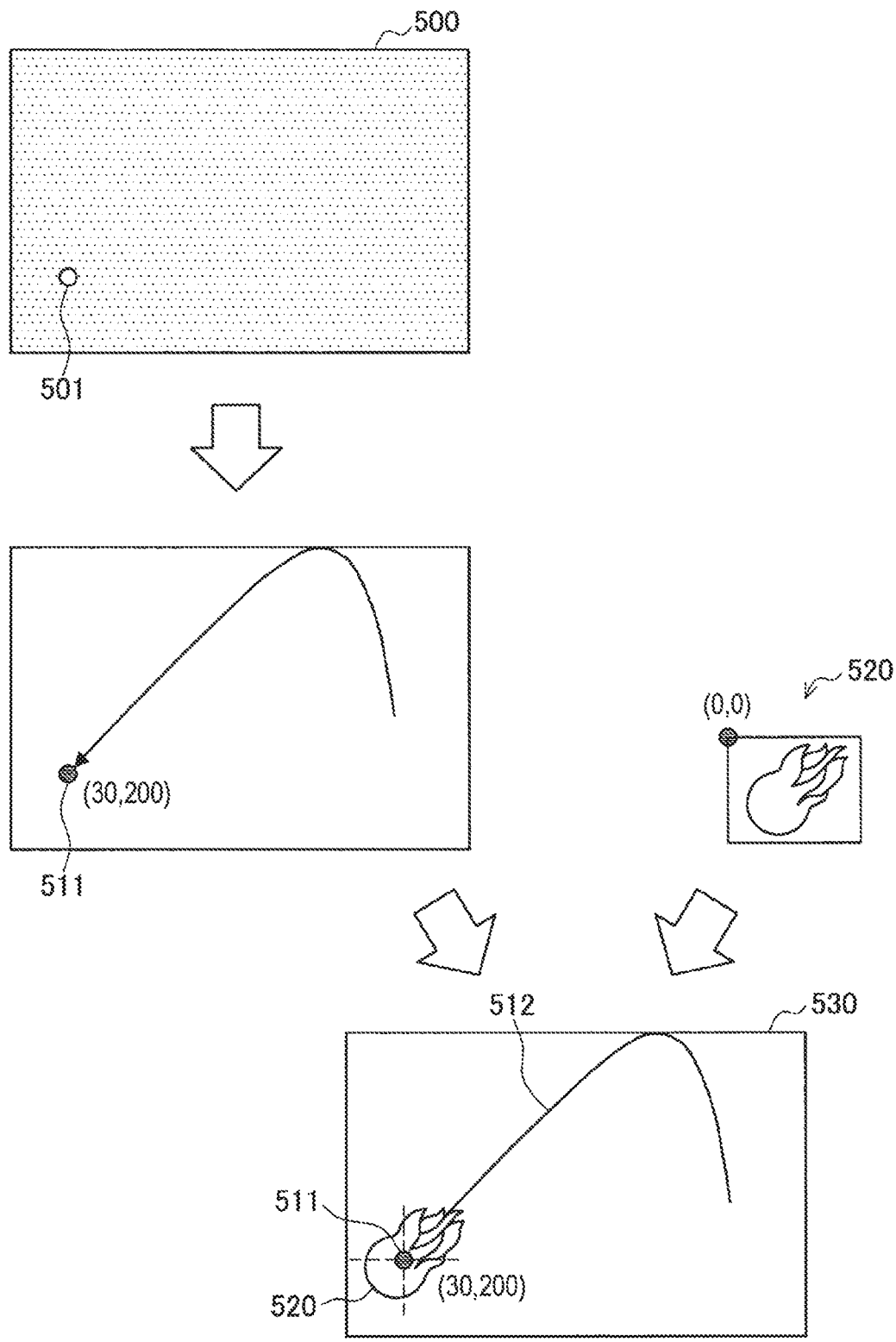
FIG. 4 is a diagram for describing an example of detection of a bright spot from a taken image and generation of video for projecting a corresponding image object according to the present embodiment.

Referring to FIG. 4, an example of detection of a bright spot from a taken image and generation of video for projecting a corresponding image object is described. As illustrated in FIG. 4, first, for example, the emission recognition unit 120 recognizes a bright spot 501 corresponding to reflection light from the reflection material 44 attached to the puck 43 from a taken image 500 acquired from the top camera 301. The emission recognition unit 120 outputs a locus of the tracked bright spot 501 to the locus management unit 131 in the management unit 130.

Next, the video generation unit 160 combines information on display coordinates 511 acquired from the coordinate transform unit 150 and an image object 520 to be projected at the position of the puck 43, and generates projection video 530. In this manner, the projection video 530 is projected on the top panel of the hockey table 50 from the projector 201, so that the image object 520 can be projected at the position of the puck 43. Note that video for projecting some image object on a locus part 512 in combination may be generated.

The position recognition processing and the generation of the projection video on the basic single detection target have been described, but in the present embodiment, stable position recognition processing can be implemented also for a plurality of detection targets, and projection video corresponding to motions of the detection targets can be generated. For example, the management unit 130 can perform collision determination in accordance with the positions and loci of the detection targets. The video generation unit 160 can generate projection video in accordance with the presence/absence of collision. Details of recognition of the detection targets are described later with reference to FIG. 5 to FIG. 7.

The emission recognition unit 120, the management unit 130, the coordinate transform unit 150, and the video generation unit 160 described above may be implemented by a control unit provided in the information processing device 10. The control unit functions as an arithmetic processing device and a control device, and controls the overall operation in the information processing device 10 in accordance with various kinds of computer programs. For example, the control unit is implemented by an electronic circuit such as a central processing unit (CPU) and a microprocessor. The control unit may include a read only memory (ROM) for storing therein computer programs and arithmetic parameters to be used and a random access memory (RAM) for temporarily storing therein parameters that change as appropriate.

The configuration of the information processing device 10 according to the present embodiment has been specifically described above. Note that the configuration of the information processing device 10 is not limited to the example illustrated in FIG. 3. For example, the information processing device 10 may be configured by a plurality of devices. The information processing device 10 may be implemented by a PC, a smartphone, an edge server, an intermediate server, or a cloud server.

3. Operation Processing

Figure 5:
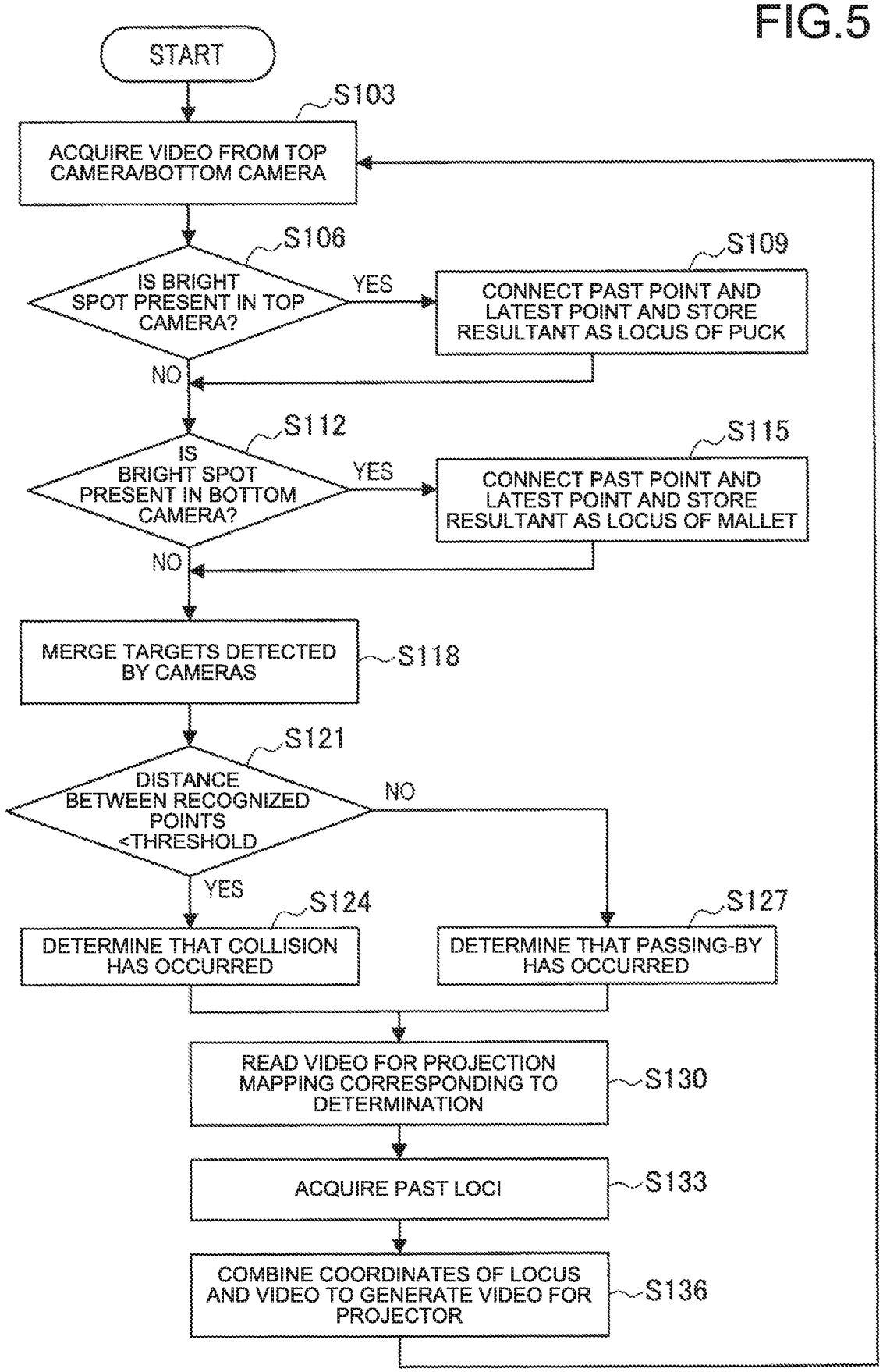
FIG. 5 is a flowchart illustrating an example of control processing according to the present embodiment.

Subsequently, operation processing of the information processing system according to the present embodiment is specifically described with reference to FIG. 5. FIG. 5 is a flowchart illustrating an example of control processing according to the present embodiment.

As illustrated in FIG. 5, first, the information processing device 10 acquires video (taken images) from the top camera 301 and the bottom camera 302 (Step S103).

Next, the emission recognition unit 120 in the information processing device 10 detects a bright spot from the taken image acquired by the top camera 301 (Step S106). When the emission recognition unit 120 has successfully detected the bright spot (Yes at Step S106), the locus management unit 131 connects a past point (previously detected bright spot) and a latest point (currently detected bright spot) of the detected bright spot, and stores the resultant as a locus of the puck 43 (Step S109).

Next, the emission recognition unit 120 detects a bright spot from the taken image acquired by the bottom camera 302 (Step S112). When the emission recognition unit 120 has successfully detected the bright spot (Yes at Step S112), the locus management unit 131 connects a past point (previously detected bright spot) and a latest point (currently detected bright spot) of the detected bright spot, and stores the resultant as a locus of the mallet 40 (Step S115).

Figure 6:
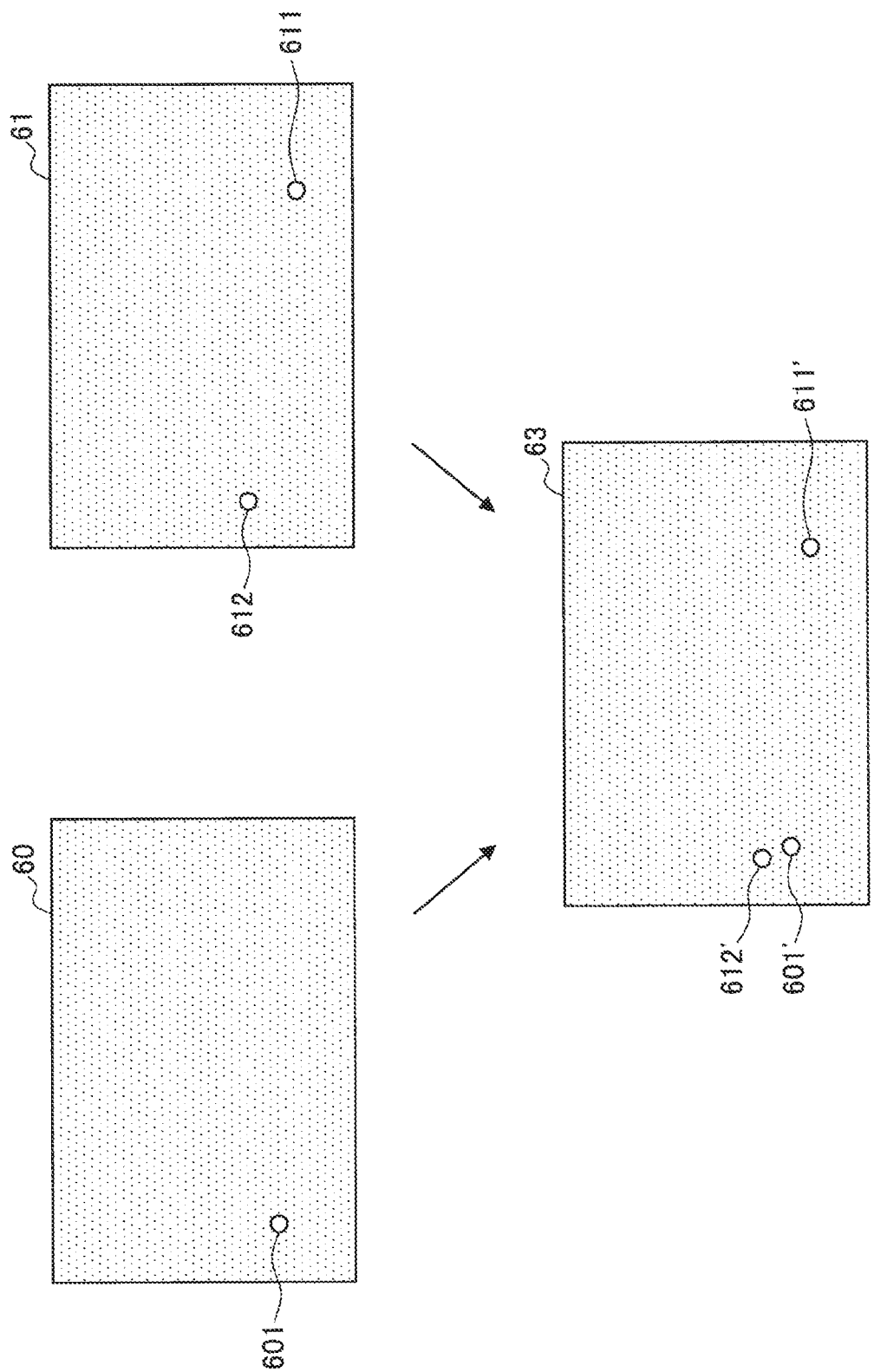
FIG. 6 is a diagram illustrating an example of merge of images taken by top and bottom cameras according to the present embodiment.

Next, the targets detected by the cameras are merged (Step S118). FIG. 6 illustrates an example of the merge of the taken images. A taken image 60 illustrated in FIG. 6 is a taken image acquired by the top camera 301, which indicates that IR emission from the input device 30 is reflected by the reflection material 44 (retroreflective material) bonded to the puck 43. A taken image 61 illustrated in FIG. 6 is a taken image acquired by the bottom camera 302, in which emission from light emitting elements 42A and 42B (IR LEDs) provided on the bottom surface of the mallets 40A and 40B are directly detected through a top panel member (for example, acrylic plate) of the hockey table 50.

Bright spots are detected from the taken images, and set as detection coordinates of the puck 43 and the mallets 40. For example, in the example illustrated in FIG. 6, a bright spot 601 acquired from the taken image 60 is detection coordinates of the puck 43, and bright spots 611 and 612 acquired from the taken image 61 are detection coordinates of the mallets 40A and 40B. Note that, in regard to individual recognition of the bright spots 611 and 612 corresponding to the plurality of mallets 40A and 40B, for example, in an air hockey game as illustrated in FIG. 1, the positions of players are determined to some degree, and the mallets 40 are operated while being gripped by the players, and hence the taken image 61 is roughly divided into regions, and for example, the bright spot 611 located on the right side can be determined as a bright spot of the mallet 40B operated by a user B and the bright spot 612 located on the left side can be determined as a bright spot of the mallet 40A operated by a user A.

Figure 2:
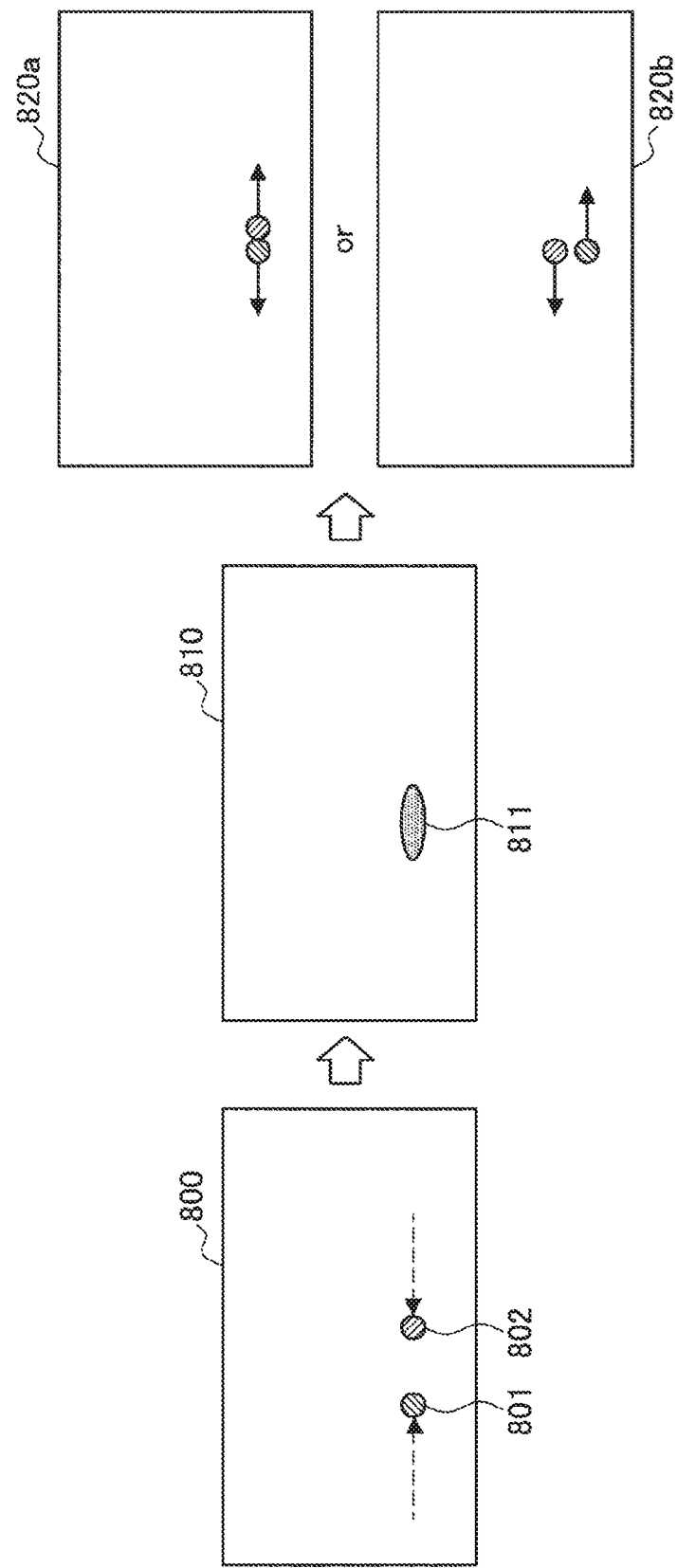
FIG. 2 is a diagram for describing erroneous recognition and lost of a detection target when recognizing a plurality of detection targets.

Based on the results of detection coordinates, the emission recognition unit 120 generates a combined image 63 obtained by combining the two detection results (taken images 60 and 61 from which bright spots have been detected) as illustrated in the lower stage of FIG. 6. In this manner, the emission recognition unit 120 can recognize positions of the puck 43 and the mallets 40 on the top panel (same surface) of the hockey table 50. As described above, in the present embodiment, various kinds of detection targets are sensed by the cameras separated in the up-down direction, and the respective positions are detected from the pieces of sensing data. Thus, even when bright spots are close to each other, the integration of the recognition targets as illustrated in FIG. 2 does not occur such that the positions can be stably recognized, and collision and passing-by described later can be determined without erroneous recognition. In other words, the unstableness that when a plurality of objects are close to each other, two bright spots are integrated and detected as one bright spot as indicated by a taken image 910 in FIG. 2, and whether the objects have collided or passed by each other is unknown and the subsequent behavior is unknown so that a tracking target is replaced is improved. Consequently, the stability of subsequent tracking of the puck 43 and the mallets 40 is secured.

Conventionally, there has been a problem in that a detection target is covered and shielded with a hand and emission cannot be stably detected. The present embodiment has a system configuration in which light from the light emitting element 42 provided on the bottom surface of the mallet 40 gripped by a hand is detected by the bottom camera 302 installed below the top panel of the hockey table 50, and reflection light from the puck 43 that is not covered is detected by the top camera 301 installed on the upper side, so that the position can be more reliably recognized.

Subsequently, the locus management unit 131 performs collision determination of recognized points (recognized bright spots, that is, detection coordinates). Specifically, for example, the locus management unit 131 compares a distance between recognized points and a predetermined threshold to determine whether collision has occurred (in the present embodiment, the case where the points have been close to each other but have not collided is referred to as "passing-by determination") (Step S121).

Figure 7:
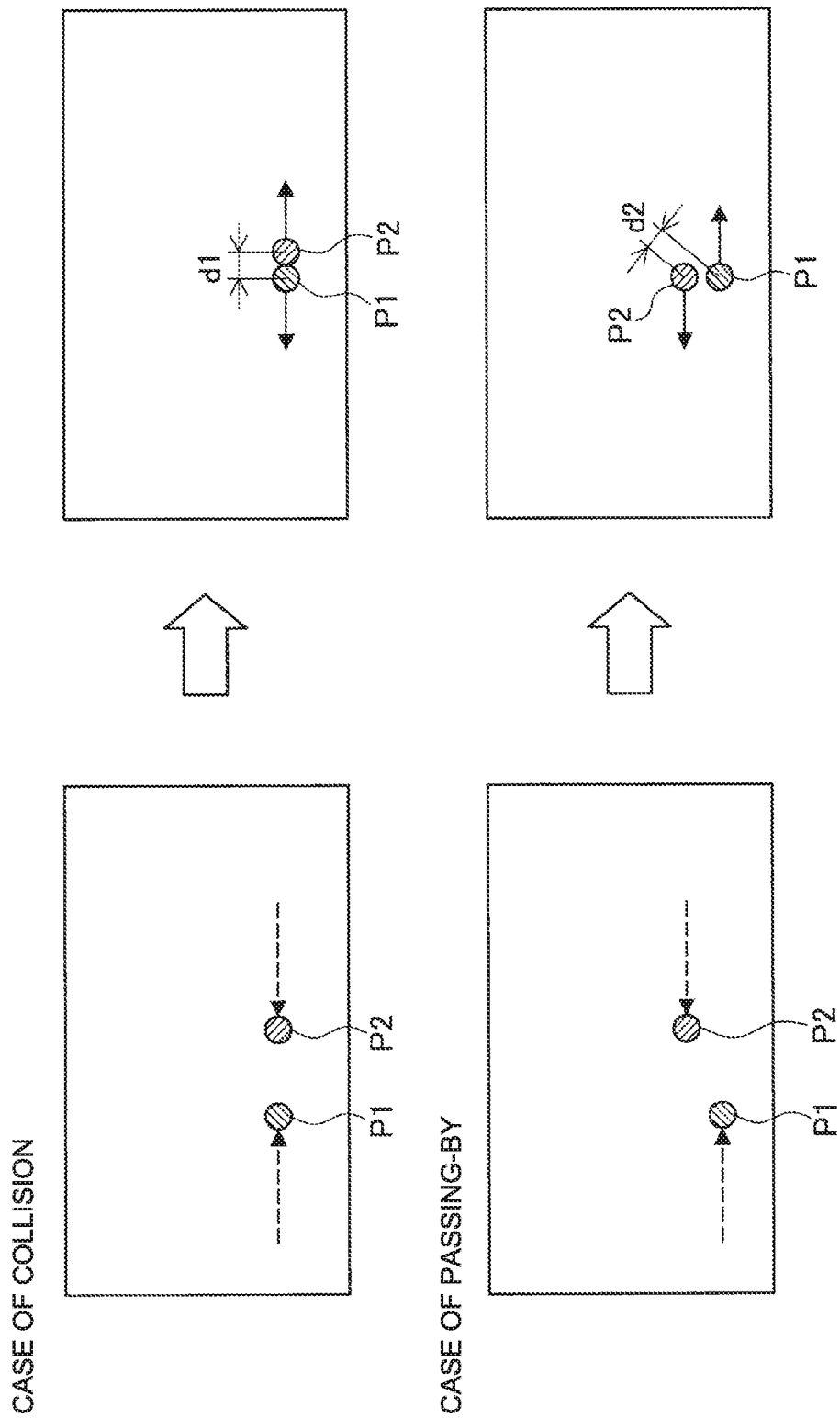
FIG. 7 is a diagram illustrating an example of collision determination and passing-by determination according to the present embodiment.

Next, when a distance d between recognized points falls below a predetermined threshold (Yes at Step S121), the locus management unit 131 determines that the two points have collided with each other (collision has occurred) (Step S124), and when the distance d between the recognized points exceeds the predetermined threshold (No at Step S121), the locus management unit 131 determines that the two points have passed by each other (collision has not occurred) (Step S127). FIG. 7 illustrates an example of collision determination and passing-by determination. The upper stage in FIG. 7 illustrates an example of collision between a bright spot P1 and a bright spot P2 together with respective loci, and the lower stage in FIG. 7 illustrates an example of passing-by of the bright spot P1 and the bright spot P2 together with respective loci. Each image is an image obtained by combining a bright spot detection result of a taken image acquired from the top camera 301 and a bright spot detection result of a taken image acquired from the bottom camera 302. For example, the locus management unit 131 determines whether a bright spot P1 and a bright spot P2 has collided (passed by) with each other based on a distance d between the bright spot P1 and the bright spot P2. Specifically, a distance d1 is below the predetermined threshold, and hence the locus management unit 131 determines that the two points have collided with each other, and a distance d2 exceeds the predetermined threshold, and hence the locus management unit 131 determines that the two points have passed by each other. In this manner, when two points are close to each other, whether the two points have collided or passed by each other can be reliably determined, and hence bright spots of two points subsequently apart from the approaching location can be accurately tracked without replacing the detection targets.

Next, the video generation unit 160 reads video for projection mapping corresponding to each determination from the storage unit 140 by using the video management unit 132 (Step S130). In the present embodiment, for example, video projected on the puck 43 or the board surface of the hockey table 50 can be switched depending on the presence/absence of collision. The control of projection video depending on the presence/absence of collision is described in detail in "4. Interaction example" described later.

Next, the video generation unit 160 acquires the past loci from the storage unit 140 by using the coordinate transform unit 150 (Step S133).

The video generation unit 160 combines the coordinates of the locus and video to generate video from the projector (Step S136). The generated video is transmitted from the I/F unit 110 to the projector 201 and projected on the hockey table 50.

An example of the operation processing according to the present embodiment has been described. Note that the operation processing illustrated in FIG. 5 is an example, and the present disclosure is not limited to the example illustrated in FIG. 5. For example, the present disclosure is not limited to the order of the steps illustrated in FIG. 5. At least some of the steps may be processed in parallel, or may be processed in the reverse order. For example, the processing at Steps S106 to S109 and the processing at Steps S112 to S115 may be processed in parallel, or may be processed in the reverse order.

4. Interaction Example

According to the embodiment described above, collision of detection targets, the positions thereof, and the positional relation of the board surface outer periphery can be detected with high accuracy in real time, and hence video projected on the board surface (projection surface) of the hockey table 50 can be changed in real time depending on the detection results to add various effects and performances.

In the present embodiment, interactions by projection control corresponding to detection results in the case where the information processing system 1 is applied to air hockey as illustrated in FIG. 1 as an example are described. According to the present embodiment, for example, an image of the board surface reflecting play contents of air hockey can be generated on the projection surface in real time, and the projected image can be recorded and reproduced.

Now, specific interactions corresponding to play contents of air hockey are described with reference to FIG. 8 to FIG. 14.

4-1. Interaction Corresponding to Collision Between Puck 43 and Mallet 40

Figure 8:
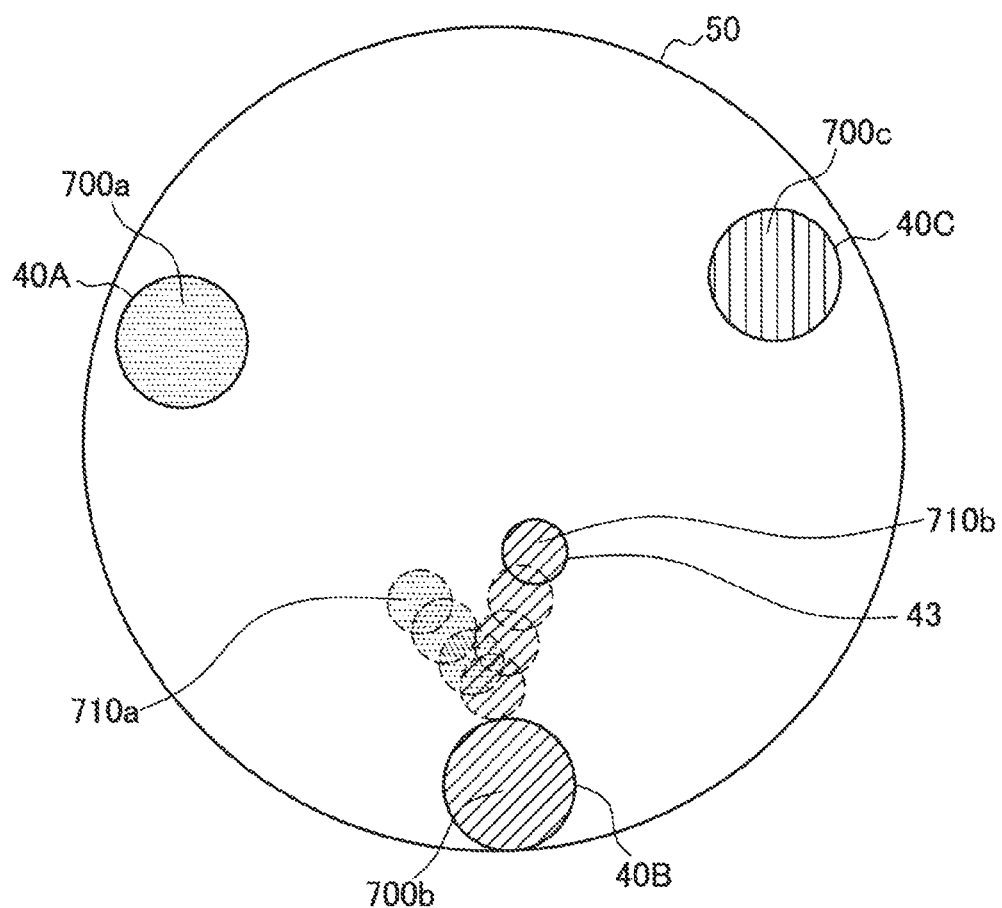
FIG. 8 is a diagram illustrating an example of interaction corresponding to collision between a puck and a mallet according to the present embodiment.

FIG. 8 is a diagram illustrating an example of interaction corresponding to collision between a puck 43 and a mallet 40. As illustrated in FIG. 8, for example, predetermined colors (or patterns) are set to mallets 40A, 40B, and 40C, and color images 700a to 700c are projected on the mallets 40A to 40C, respectively. The color images 700a to 700c follow changes in position of the mallets 40A, 40B, and 40C in real time, and are always projected on the mallets 40A, 40B, and 40C.

Next, when the information processing device 10 has detected collision between the mallet 40 and the puck 43, that is, when a user has hit the puck 43 with the mallet 40, the information processing device 10 changes parameters (color, shape, and size) of an image projected on the puck 43. For example, the information processing device 10 may set the color set to the collided puck 43 to the mallet 40. For example, in the example illustrated in FIG. 8, in the case where a color image 710a of the same color as the color image 700a of the mallet 40A is projected on the puck 43 first hit by the mallet 40A and the mallet 40B next hits the puck 43, a color image 710b of the same color as the color image 700b of the mallet 40B is projected on the puck 43. Such a case where the color and pattern of the puck 43 are changed to the same color and pattern of the collided mallet 40 is exemplified.

The information processing device 10 may change the size of the image projected on the collided puck 43. For example, the size of the image may be temporarily changed to implement feedback of the collision, or the size of the image may be gradually increased for each collision.

In the case where the information processing device 10 successively records position information on the puck 43 and displays the locus of the puck 43, the information processing device 10 may change the color of the locus depending on collision. Specifically, for example, the information processing device 10 changes the colors of the puck 43 and its locus to the color set for the collided mallet 40.

The information processing device 10 may present feedback sound or tactile sense in response to collision between the puck 43 and the mallet 40. For example, the presentation of tactile sense can be performed on the mallet 40. By mounting an actuator to the mallet 40, the information processing device 10 can transmit a predetermined stimulus output signal to a target mallet 40 in response to collision, and present stimulus output (such as vibration and temperature) on the mallet 40.

The information processing device 10 may change parameters of visual sense (color, shape, and size), sound, and tactile sense for feedback depending on the speed of the puck 43 hit by the mallet 40.

4-2. Interaction Corresponding to Collision Between Puck 43 and Outer Peripheral Wall The information processing device 10 can implement interaction corresponding to collision between a puck 43 and the outer peripheral wall in a play area (on hockey table 50). For example, the information processing device 10 may change parameters (color, shape, and size) of images projected on the puck 43 and the locus of the puck 43 at the moment at which the puck 43 collides with the outer peripheral wall.

Figure 9:
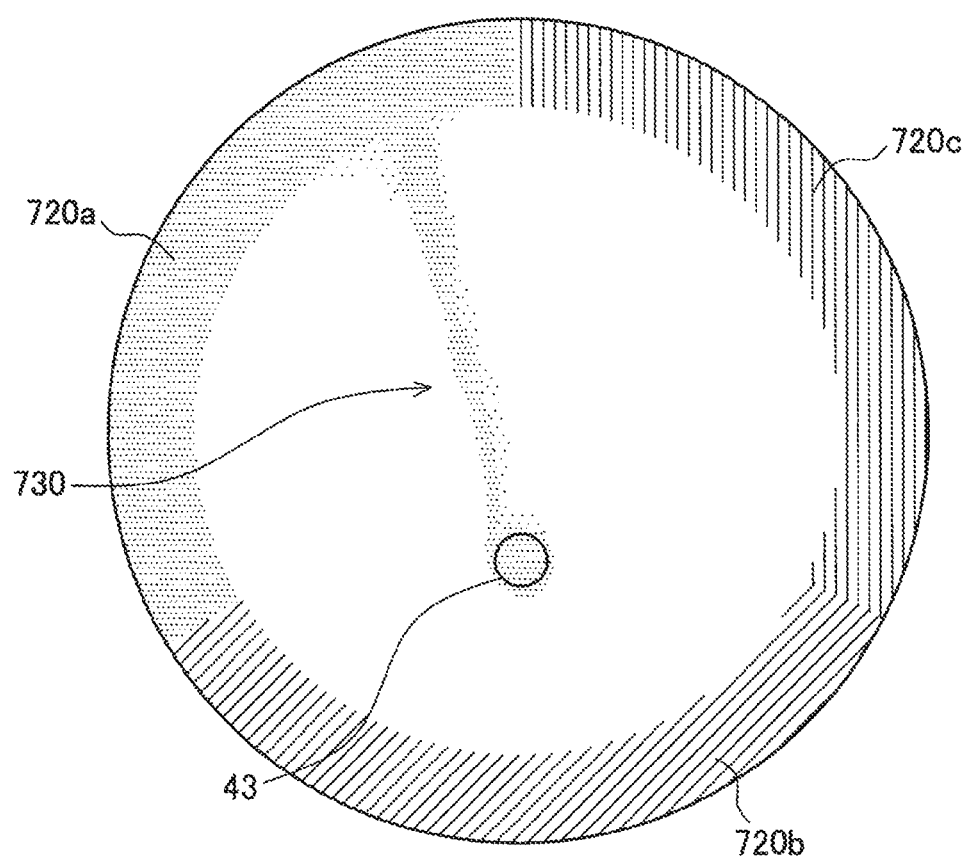
FIG. 9 is a diagram illustrating an example of interaction corresponding to collision between a puck and an outer peripheral wall according to the present embodiment.

FIG. 9 is a diagram illustrating an example of interaction corresponding to collision between the puck 43 and the outer peripheral wall. As illustrated in FIG. 9, for example, when areas 720a to 730c corresponding to territories of users are projected on the board surface of the hockey table 50 (it is assumed that projection parameters of areas 720a to 720c are same as or related to projection parameters of mallets 40 of users), the information processing device 10 projects parameters such as the color in a region of the collided outer peripheral wall to the puck 43 and the locus of the puck 43. For example, in the example illustrated in FIG. 9, when the puck 43 collides with the outer peripheral wall in the area 720a, a locus 730 with the same projection parameters as the projection parameters of the area 720a is displayed.

When the puck 43 collides with outer peripheral walls in the areas 720a to 720c (corresponding to goals of other players) of colors different from the color of the puck 43 (color of mallet 40 of hitting player), the information processing device 10 may control the area of the area 720 (territory of player who has hit puck 43) of the color of the puck 43 so as to increase. For example, in the example illustrated in FIG. 9, when the puck 43 collides with the outer peripheral wall in the area 720b (that is, when player who should defend area 720b could not bounce puck 43 to defend his/her own goal), the area of the area 720a (area of same color as color of puck 43) of the player who hit the puck 43 is increased. In this manner, each player can sensuously grasp the degree of victory or defeat of his/her own while playing a competition by the size of his/her own area 720, and intuitively grasp victory or defeat without checking the scores.

The information processing device 10 may present feedback sound or tactile sense at the moment at which the puck 43 collides with the outer peripheral wall.

The information processing device 10 may change parameters of visual sense (color, shape, and size), sound, and tactile sense for feedback depending on the speed of the puck 43 colliding with the outer peripheral wall.

4-3. Feedback Corresponding to Collision Based on Virtual Size of Puck 43/Mallet 40

The information processing device 10 can use a projected image to change (enlarge or reduce: set virtual collision determination region) the size of a puck or a mallet to a virtual size different from the actual physical size. The information processing device 10 determines collision of a puck or a mallet having a virtual size, and performs feedback such as change of video, sound, and tactile sense.

Figure 10:
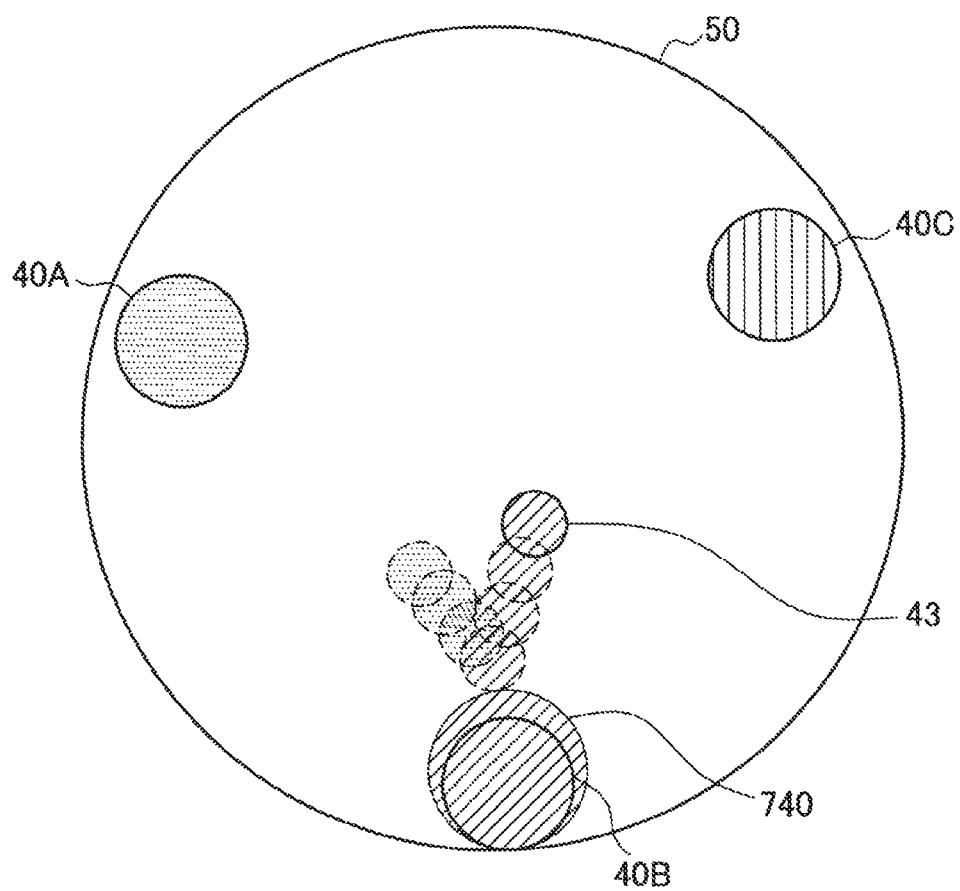
FIG. 10 is a diagram illustrating an example of interaction based on collision in a virtual size of a mallet according to the present embodiment.
Figure 11:
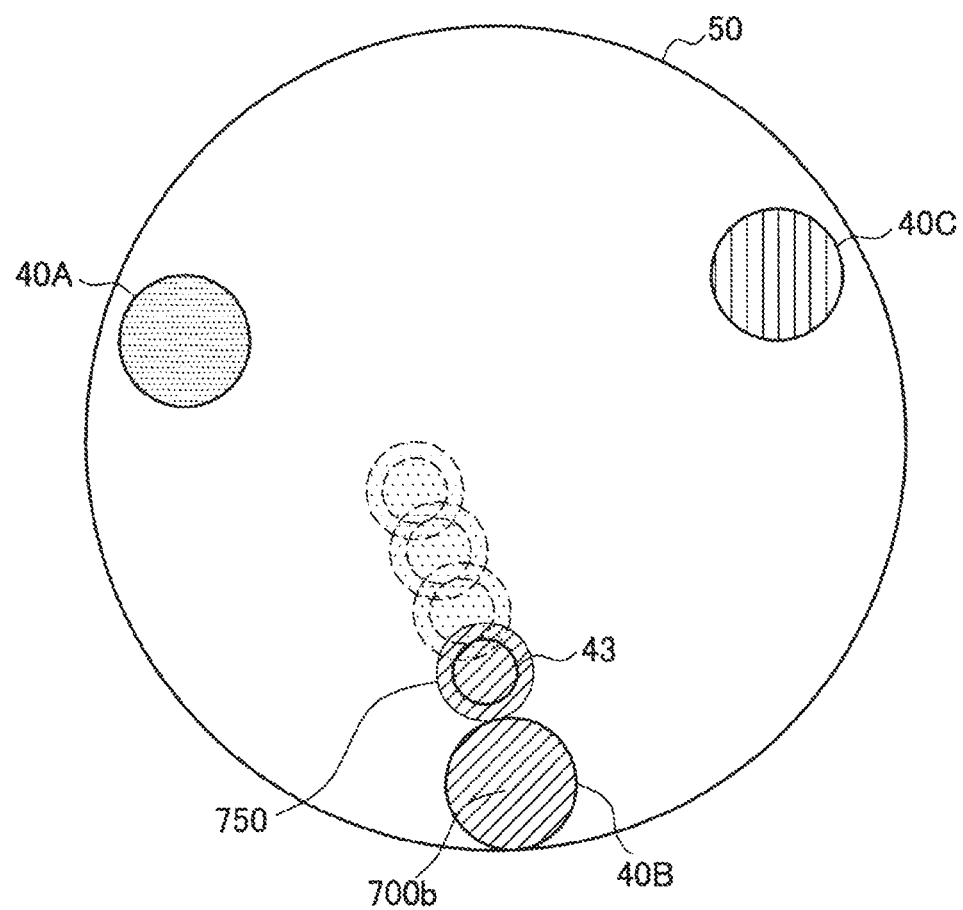
FIG. 11 is a diagram illustrating an example of interaction based on collision in a virtual size of a puck according to the present embodiment.

FIG. 10 illustrates an example of interaction corresponding to collision based on a virtual size of a mallet. FIG. 11 illustrates an example of interaction based on collision with a virtual size of a puck.

In the example illustrated in FIG. 10, the size of the mallet 40B, which is a real object, is virtually increased by projection of a virtual size image 740. The information processing device 10 determines collision between the puck 43 and the virtual size image 740, and performs feedback such as change of video, sound, and tactile sense in accordance with collision timing. For example, the information processing device 10 can accurately detect the positions of the puck 43 and the mallet 40B in real time as described in the above-mentioned embodiment, and hence can determine, based on the virtual size set for the mallet 40B, the instance at which the puck 43 collides with the contour of the set virtual size region of the mallet 40B in real time. In the example illustrated in FIG. 10, feedback is performed to change a projection parameter (for example, color) of the puck 43 to the same projection parameter (for example, color) of the collided virtual size image 740.

In the example illustrated in FIG. 11, similarly, the size of the puck 43, which is a real object, is virtually increased by projection of a virtual size image 750. The information processing device 10 determines collision between the virtual size image 750 and the mallet 40B, and performs feedback such as change of video, sound, and tactile sense in accordance with collision timing. In the example illustrated in FIG. 11, feedback is performed to change a projection parameter (for example, color) of the virtual size image 750 to the same projection parameter (for example, color) of the collided mallet 40B.

In this manner, even when the mallet 40B/puck 43, which is an actual object, has actually collided, the information processing device 10 can perform feedback at the timing of collision with the contour of the region of the virtual size, and display a bouncing locus at a collision position with the contour of the region of the virtual size, so that an effect that the size of the physical puck or mallet seems to change can be provided to users.

4-4. Feedback Corresponding to Collision of Virtual Puck

The information processing device 10 can introduce, in addition to the physical puck 43, a virtual puck composed of only projected video (herein referred to as "virtual puck"), and provide a series of feedback based on collision between the virtual puck and the mallet 40.

Figure 12:
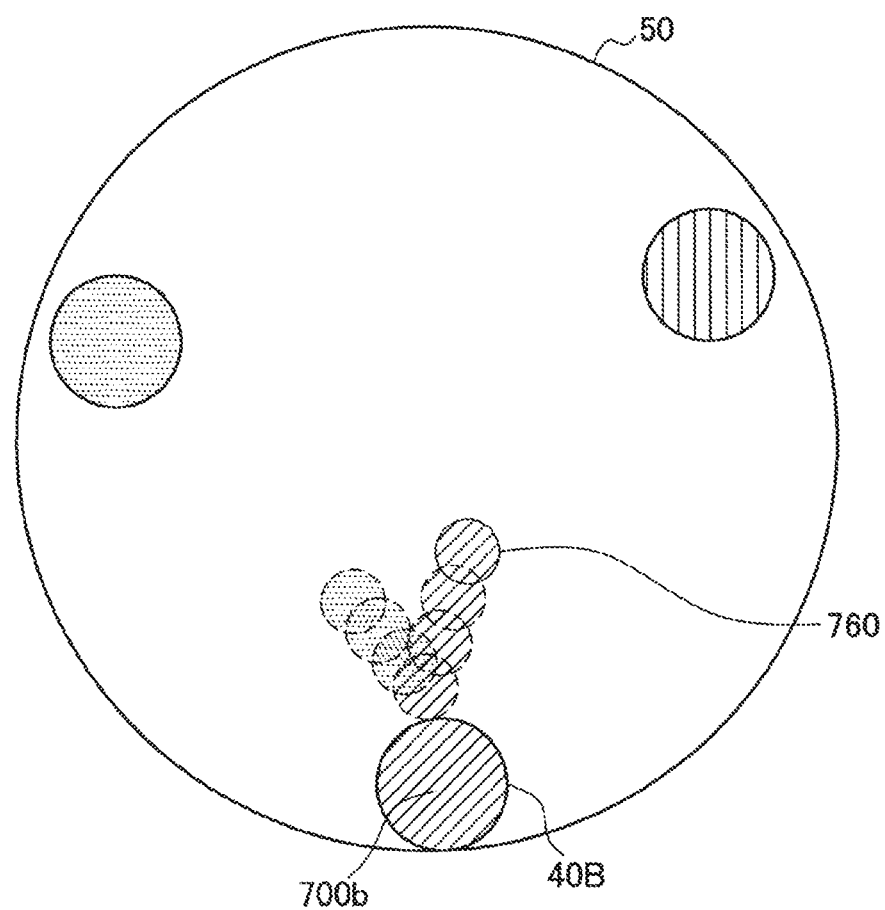
FIG. 12 is a diagram illustrating an example of feedback corresponding to collision between a virtual puck and a physical puck according to the present embodiment.

FIG. 12 is a diagram illustrating an example of feedback corresponding to collision between a virtual puck 760 and the physical mallet 40B. The information processing device 10 can accurately detect the position of the mallet 40 in real time as described in the above-mentioned embodiment, and hence can determine the instance at which the virtual puck 760 collides with the mallet 40B in real time based on the motion (positional change) of the virtual puck 760 projected on the board by the projector 201. In the example illustrated in FIG. 12, feedback is performed to change a projection parameter (for example, color) of the virtual puck 760 to the same projection parameter (for example, color) of the collided mallet 40B.

The information processing device 10 may calculate a bouncing direction and speed based on the speed and angle of collision of the virtual puck 760 with the mallet 40B, and control the motion of the virtual puck 760 with higher reality.

In this manner, the information processing device 10 according to the present embodiment performs feedback such as change of video, sound, and tactile sense when the virtual puck 760 collides with the physical mallet 40, and can thereby provide a sense as if the physical puck collides to the user.

By setting such feedback in the same manner as in the collision with the physical puck 43, a player can feel illusion as if the player hits a really existing puck. By providing feedback different from the case of the collision with the physical puck 43, sharp discrimination from the physical puck 43 can be facilitated.

For example, the information processing device 10 may change the presentation of tactile sense (such as light/heavy and soft/hard) between the case of collision with the physical puck 43 and the case of collision with the virtual puck 760.

Figure 13:
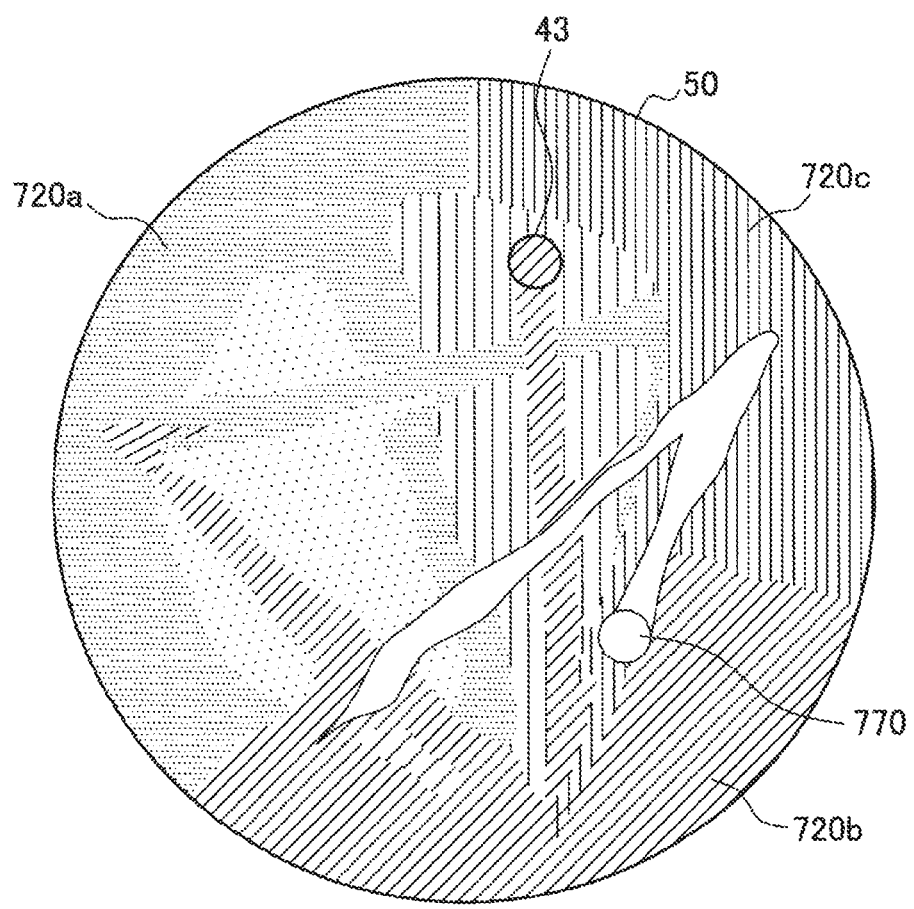
FIG. 13 is a diagram illustrating an example of the case where locus control is changed between the virtual puck and the physical puck according to the present embodiment.
Figure 14:
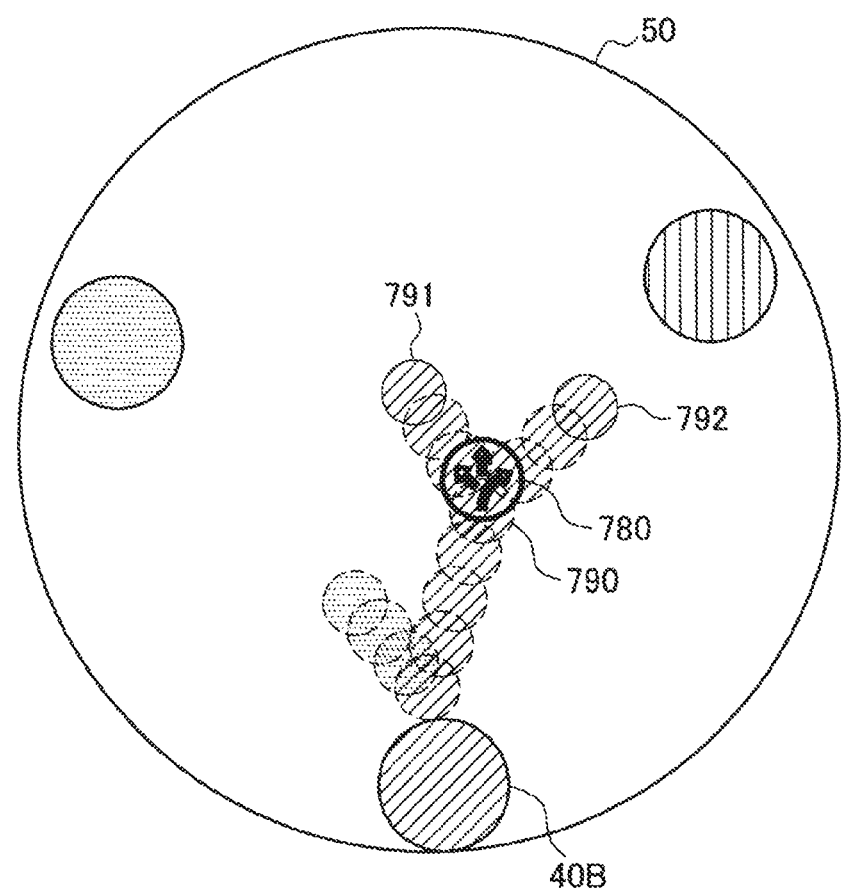
FIG. 14 is a diagram illustrating an example of change in characteristics of a virtual puck when the virtual puck passes on a predetermined item according to the present embodiment.

The information processing device 10 may change locus control between the physical puck 43 and the virtual puck. For example, as illustrated in FIG. 13, the information processing device 10 may change the color of the locus of the physical puck 43 to the same color as the projection color of the puck 43, and delete the color of the locus of the virtual puck 770. In other words, in the example illustrated in FIG. 13, the role of adding the color to the board surface is provided to the physical puck 43, but the role of deleting the color generated for the board surface is provided to the virtual puck 770.

The virtual puck has no physical constraints, and hence the number, the size, the speed, the reflection coefficient, and the friction coefficient can be dynamically changed (change in characteristics). For example, the information processing device 10 may perform control to increase the size of the virtual puck or increase the moving speed of the virtual puck each time the virtual puck is hit. When the virtual puck is strongly hit, the information processing device 10 may split the virtual puck into a plurality of pucks. The information processing device 10 may control the virtual puck to move nonlinearly under particular conditions. The information processing device 10 may teleport the virtual puck or combine/eliminate the virtual puck after a predetermined time elapses.

The information processing device 10 may change the characteristics of the virtual puck (increase size or split) in response to direct interaction between the physical puck and the mallet or through a predetermined item. For example, the information processing device 10 may change particular characteristics when the virtual puck passes over an item displayed on the board surface under predetermined conditions. In the example illustrated in FIG. 14, when the virtual puck 790 passes over a region of an item 780 called splitter, the virtual puck 790 is split into two virtual pucks 791 and 792.

Note that it is difficult to dynamically control the speed and the physical properties of the physical puck 43 by using such an item, but by changing the color of a projection image displayed on the puck 43 in a superimposed manner or changing the size of a collision determination region, illusion that the size of the puck 43 changes depending on an item can be provided.

Furthermore, collision determination between the virtual puck and the physical puck can be performed, and hence interaction of both pucks in combination can be presented. Specifically, for example, the information processing device 10 may perform control such that only the virtual puck is bounced when the virtual puck collides with the physical puck, or such that the virtual puck is split when the virtual puck collides with the physical puck. When the physical puck is strongly hit, a virtual puck may be generated from the physical puck. The information processing device 10 may control a virtual puck to be absorbed by a physical puck after a predetermined time elapses.

4-5. Recording of Board Surface Image

The information processing device 10 can accumulate board surface images in the storage unit 140, and reproduce (projection display) the board surface image on the board surface. The information processing device 10 can reproduce a log of processes for generating board surface images (that is, reproduce locus of puck or mallet with time).

4-6. Flow of Interaction Control Processing

Figure 15:
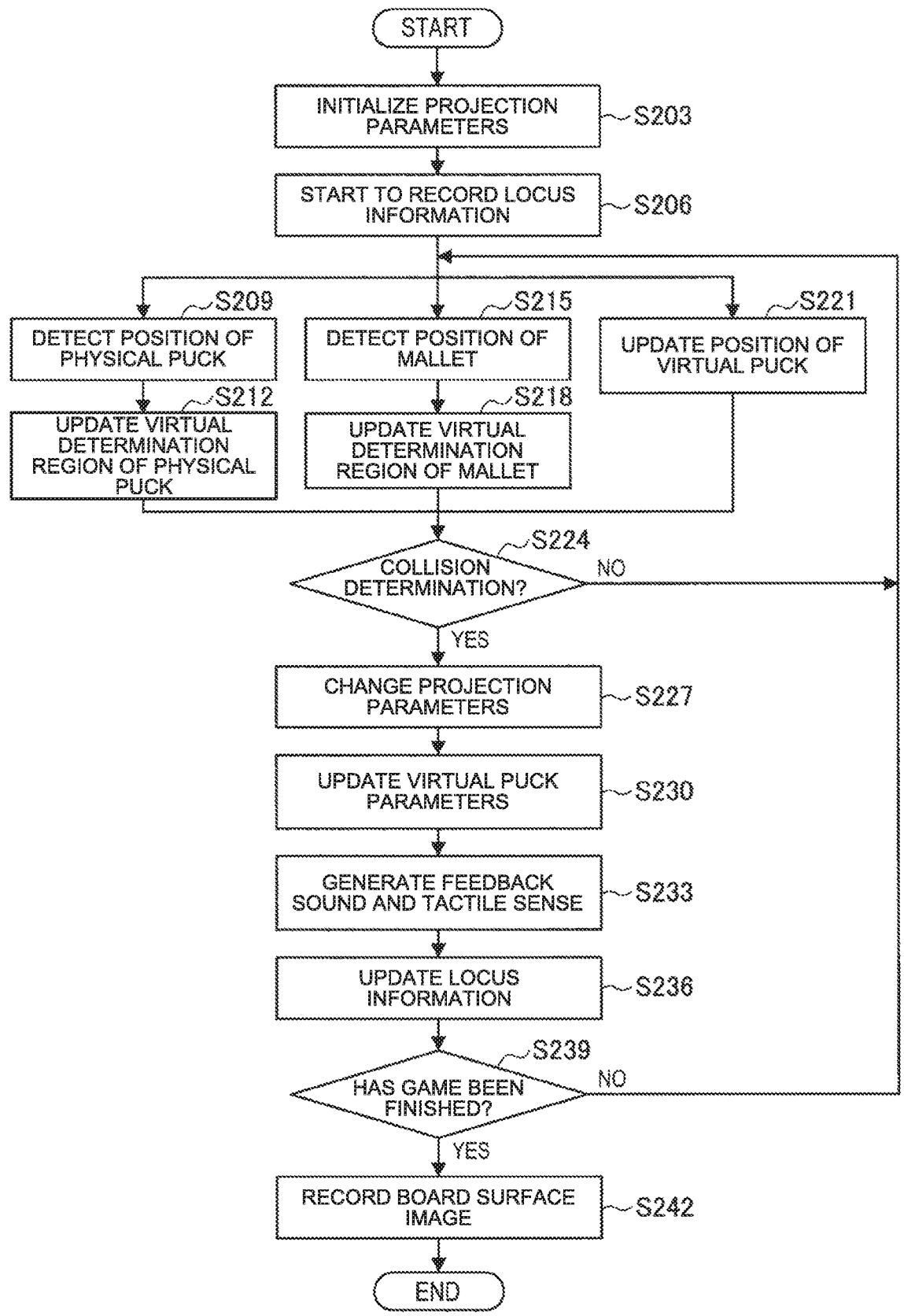
FIG. 15 is a flowchart illustrating an example of the flow of control processing of interaction according to the present embodiment.

Next, the flow of control processing of the interaction according to the present embodiment described above is described with reference to FIG. 15. FIG. 15 is a flowchart illustrating an example of the flow of control processing of the interaction according to the present embodiment.

As illustrated in FIG. 15, first, the information processing device 10 initializes projection parameters related to projection on the board surface (Step S203). Examples of the projection parameters include colors, shapes, and sizes of video projected on the mallets 40, the puck 43, and the board surface.

Next, the information processing device 10 starts to record locus information (Step S206).

Specifically, first, the information processing device 10 uses the emission recognition unit 120 to detect the position of the physical puck 43 based on a taken image acquired from the bottom camera 302 (Step S209). When a virtual determination region has been set, the information processing device 10 updates a virtual determination region corresponding to the puck 43 (for example, virtual size image 750 illustrated in FIG. 11) (Step S212). For example, the information processing device 10 may set the fixed value or change the value with time (for example, puck size is first small and is increased as game play time increases), or may change the value along with game conditions (for example, mallet of player with lower score is increased).

The information processing device 10 uses the emission recognition unit 120 to detect the position of the physical mallet 40 based on a taken image acquired from the top camera 301 (Step S215). When a virtual determination region has been set, the information processing device 10 updates a virtual determination region corresponding to the mallet 40 (for example, virtual size image 740 illustrated in FIG. 10) (Step S218).

When a virtual puck has been introduced, the information processing device 10 updates the position of the virtual puck (Step S221).

Next, the information processing device 10 performs collision determination (Step S224). Specifically, as described in the above-mentioned embodiment, the information processing device 10 may perform the collision determination by combining the taken image acquired from the top camera 301 and the taken image acquired from the bottom camera 302 and based on a distance between recognized points of bright spots corresponding to the mallet 40 and the puck 43. When a virtual determination region has been set for the mallet 40 or the puck 43, the information processing device 10 may perform the collision determination in consideration of the virtual determination region. When a virtual puck has been introduced, the information processing device 10 may perform the collision determination in consideration of the position of the virtual puck.

Next, when it is determined that the collision has occurred (Yes at Step S224), the information processing device 10 changes the projection parameters (such as color, shape, and size) depending on the collision (Step S227).

Next, the information processing device 10 updates virtual puck parameters depending on the collision (Step S230). The virtual puck parameters are characteristics of the virtual puck, and examples thereof include speed, number, size, reflection coefficient, and friction coefficient. The information processing device 10 controls the change in speed of the virtual puck or the split/absorption (increase/decrease in number) in accordance with the collision.

Next, the information processing device 10 generates feedback sound or tactile sense corresponding to the collision (Step S233). The generated feedback sound or tactile sense is presented by an acoustic device or the mallet 40.

Next, the information processing device 10 updates locus information (Step S236).

Next, the information processing device 10 repeats the locus information recording processing indicated by Steps S209 to S236 until the game is finished (Step S239).

When the game is finished (Yes at Step S239), the information processing device 10 records a (final) board surface image (Step S242).

An example of the operation processing according to the present embodiment has been described. Note that the operation processing illustrated in FIG. 15 is an example, and the present disclosure is not limited to the example illustrated in FIG. 15. For example, the present disclosure is not limited to the order of the steps illustrated in FIG. 15. At least some of the steps may be processed in parallel, or may be processed in the reverse order. For example, the pieces of processing at Steps S227 to S239 may be processed in parallel, or may be processed in a different order.

5. Application Example

Regarding the information processing system 1 according to the present embodiment applied to air hockey, the position detection for more reliably detecting the positions of each mallet 40 and the puck 43 as an example of detection targets, the collision determination based on detection results, and interaction by video, sound, and tactile sense corresponding to the collision determination have been described above. However, the position detection technology according to the present disclosure is applicable to various scenes in addition to air hockey. Application examples of the present embodiment are described below by way of some specific examples.

5-1. Position Detection of Person in Room

Figure 16:
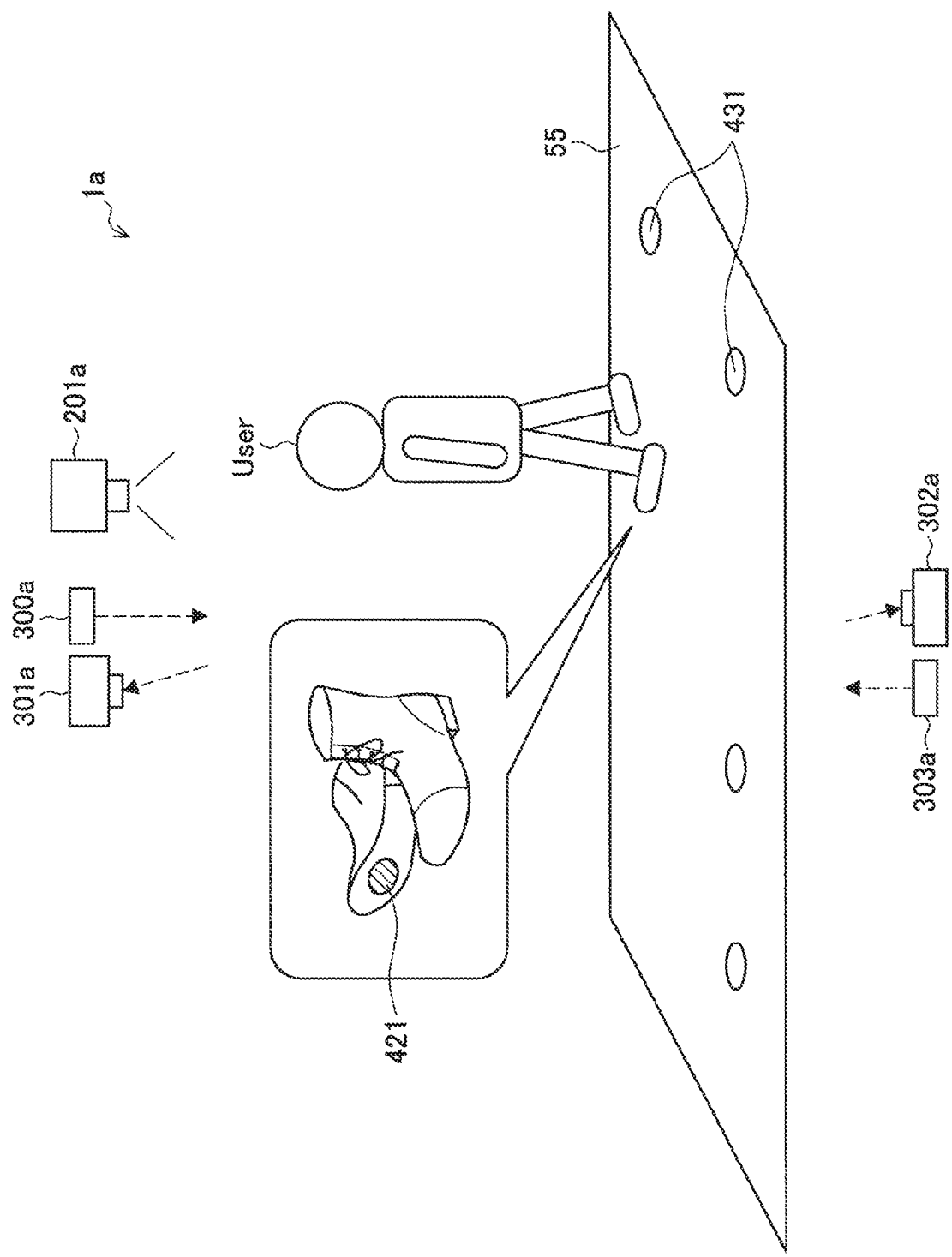
FIG. 16 is a diagram for describing a first application example of the present embodiment.

For example, the information processing system 1 according to the present embodiment can detect the position of a person in a room. FIG. 16 is a diagram for describing a first application example of the present embodiment.

As illustrated in FIG. 16, for example, a floor surface 55 of a room is constructed by a member that transmits a predetermined detection wavelength (for example, acrylic that transmits IR), and a reflection material 421 such as a retroreflective marker is bonded to a shoe sole of a user. IR is projected by a projector (illumination device 303*a*) from below the floor, and the position of the person is recognized from sensing data obtained by sensing the reflection of IR by an imaging device 302*a*.

For example, in entertainment, such a system can perform processing for detecting where a user is in a giant maze and control an enemy such as a robot to approach toward the user by autonomous travel. For example, the position of the robot is calculated from sensing data obtained by projecting IR to a reflection material such as a retroreflective marker bonded to the head of the robot from a ceiling by a projector (illumination device 300*a*) and sensing reflection light by an imaging device 301*a*.

IR may be projected to a reflection material 431 such as a retroreflective marker bonded to the floor surface 55 from a ceiling by the projector (illumination device 300*a*), and reflection light may be sensed by the imaging device 301*a*. Based on sensing data obtained by the sensing, processing for firing a trap when a user walks on the reflection material 431 of the floor surface 55 and shields reflection light can be performed.

In the example illustrated in FIG. 16, predetermined video can be projected on the floor surface 55 by a projector 201a installed on the ceiling in accordance with the position of the user or the firing of a trap.

5-2. Application to Card Game

Figure 17:
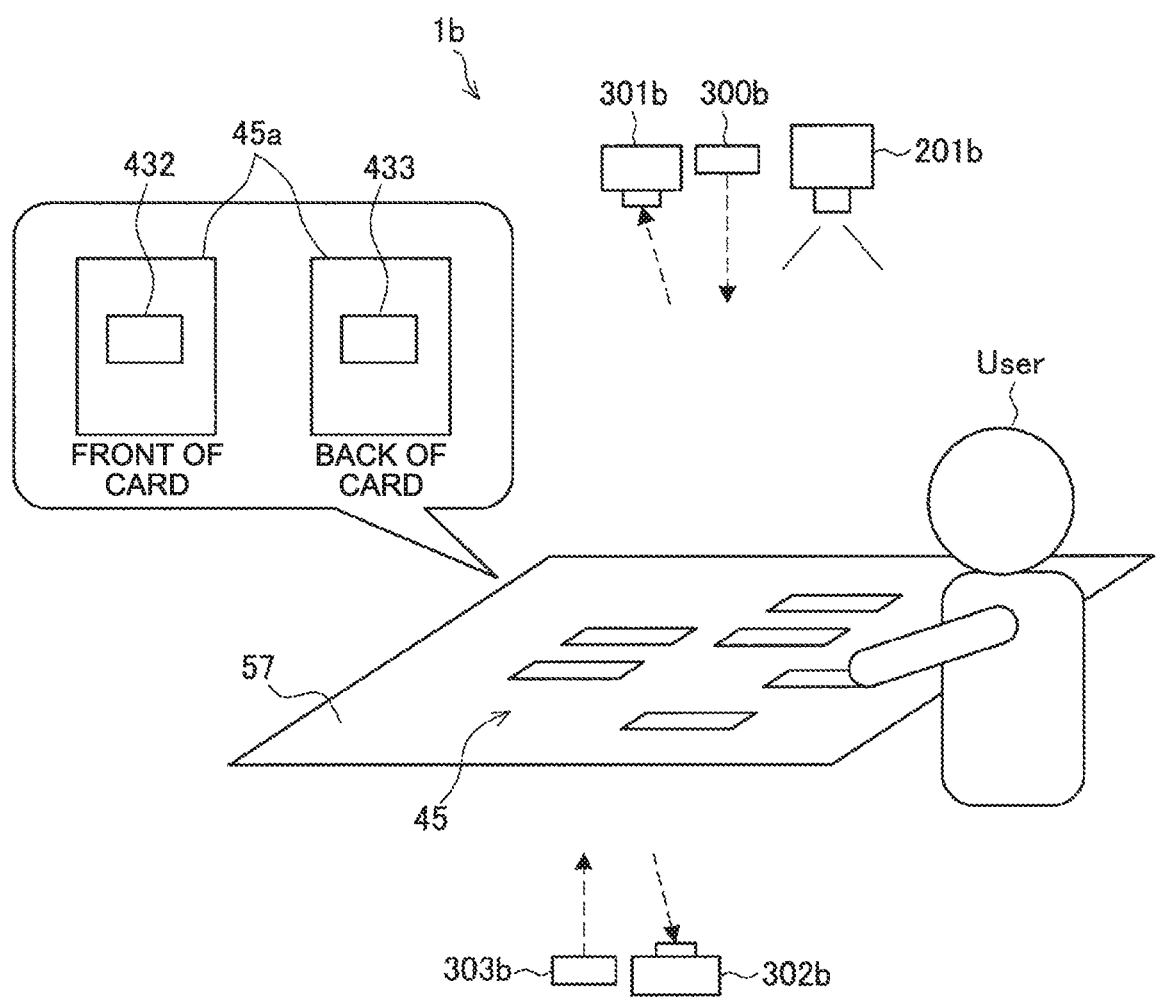
FIG. 17 is a diagram for describing a second application example of the present embodiment.

For example, the information processing system 1 according to the present embodiment can detect the position and the front/back side of a card in a card game. FIG. 17 is a diagram for describing a second application example of the present embodiment.

As illustrated in FIG. 17, for example, a table top surface 57 is created by a member that transmits a predetermined detection wavelength (for example, acrylic that transmits IR), and unique markers (reflection materials) 432 and 433 are bonded to both surfaces of a card 45, respectively.

IR is projected by a projector (illumination device 303b) from below the table top surface 57, and reflection light from a marker is sensed by an imaging device 302b, so that the position and the front/back side of the card are detected from the obtained sensing data. On the other hand, IR is projected by a projector (illumination device 300b) from the upper side, and reflection light is sensed by an imaging device 301b, so that a card covered with a user's hand is recognized from a shielding location of reflection light from the marker based on the obtained sensing data.

In this manner, for example, an effect such as projection can be projected onto a card shaded with a hand by a projector 201b, and an effect having game property reflecting the position relation with another card and the front/back side of the card can be projected.

5-3. Application to Bouldering

Figure 18:
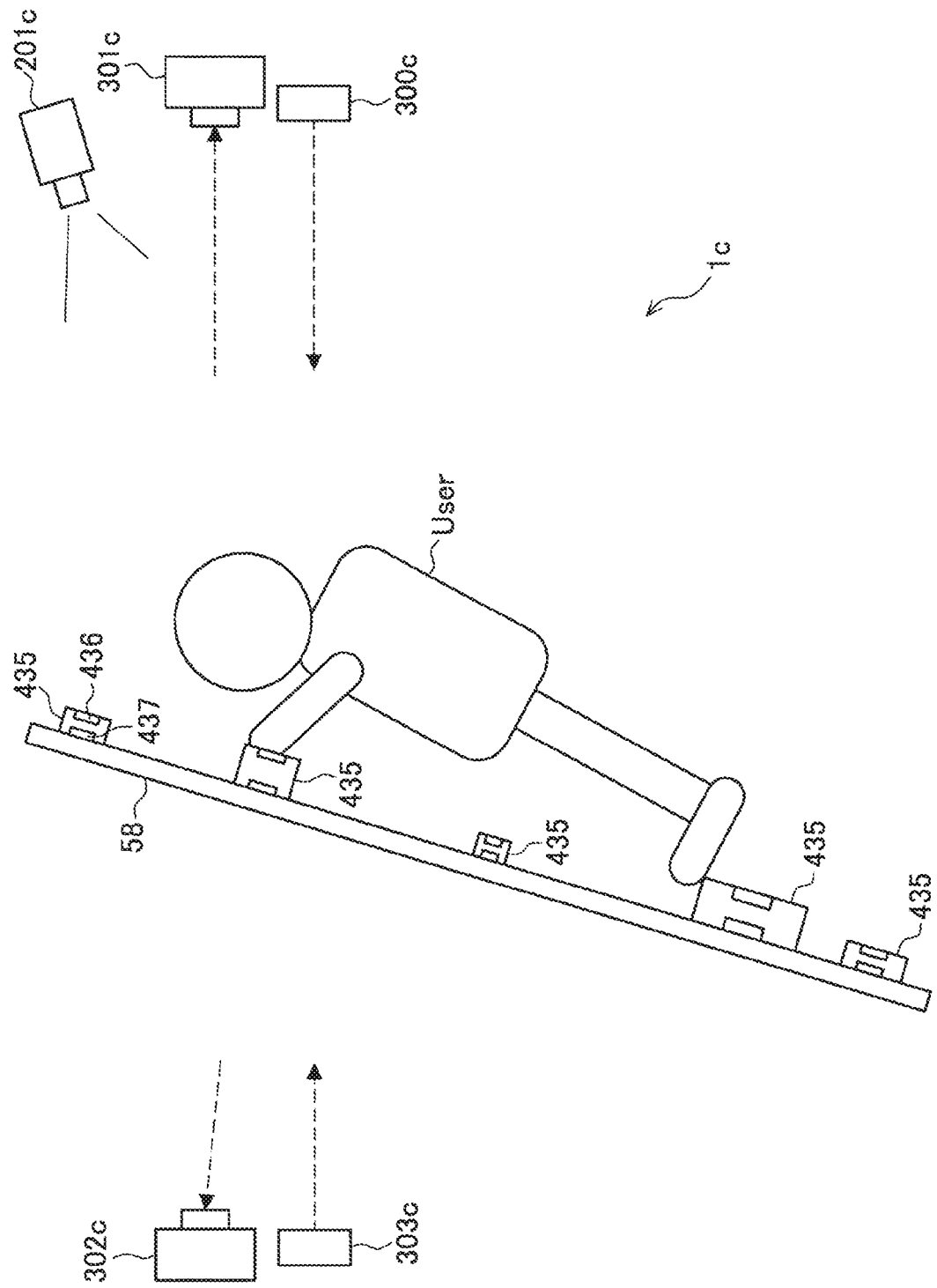
FIG. 18 is a diagram for describing a third application example of the present embodiment.

For example, the information processing system 1 according to the present embodiment can be applied to recognition of the positions of holds on the bouldering wall and the position of a user. FIG. 18 is a diagram for describing a third application example of the present embodiment.

As illustrated in FIG. 18, for example, a bouldering wall 58 is constructed by a member that transmits a predetermined detection wavelength (for example, acrylic that transmits IR), and reflection materials 436 and 437 such as retroreflective markers are bonded to both surfaces of each hold 435. Reflection light from the reflection materials 436 and 437 are sensed by imaging devices 301c and 302c (for example, retroreflection) from the front and rear surfaces of each hold 435, and based on the sensing data, the front side gripped by a user is recognized by a shielding location of reflection light, and the position of the hold can be stably recognized from the rear surface. The hold gripped by the user can be more reliably recognized by difference of sensing data before and after the sensing.

In this manner, for example, an effect such as projection can be projected by a projector 201c depending on the position of a user and the location of a hold.

Figure 19:
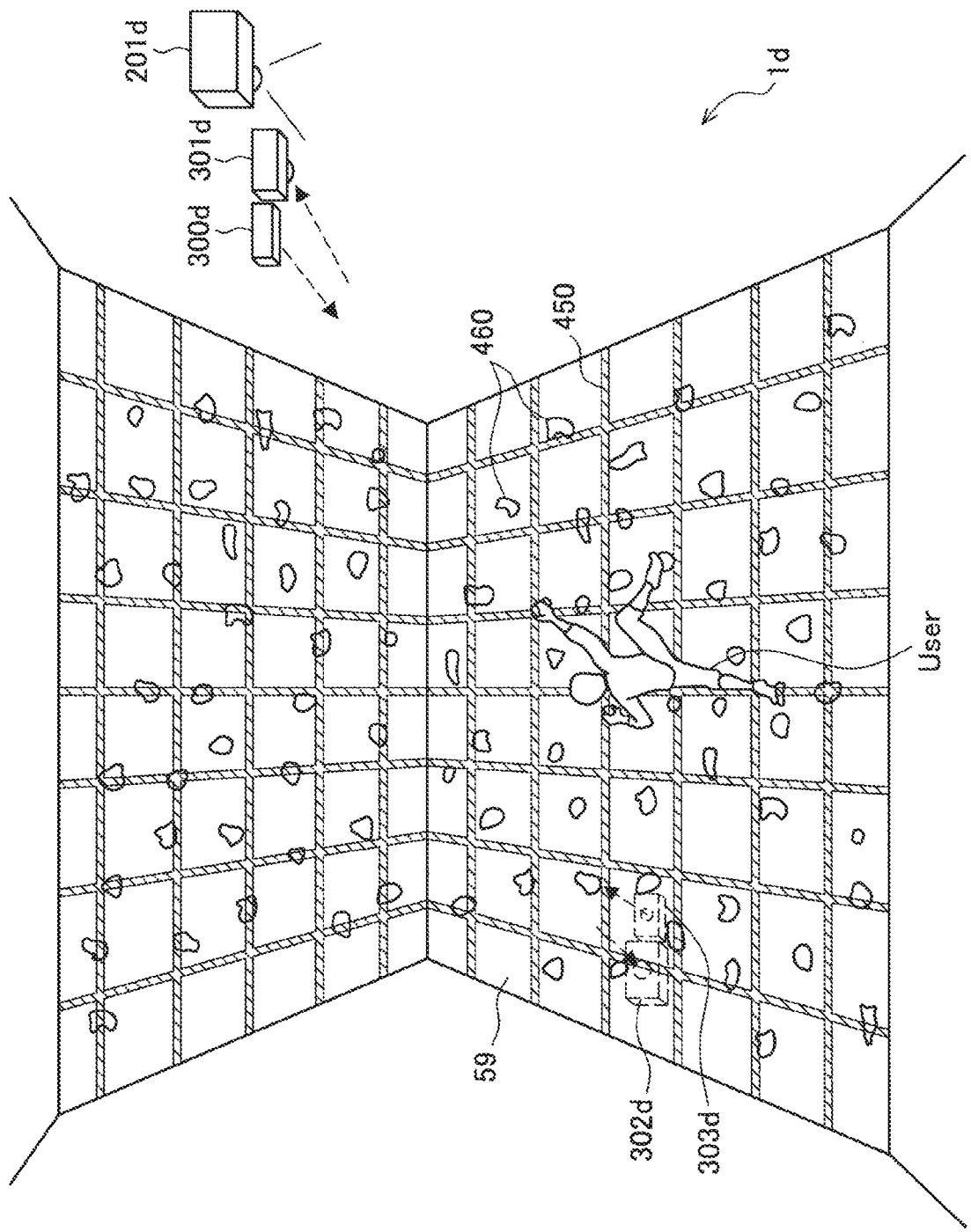
FIG. 19 is a diagram for describing another example of the third application example of the present embodiment.

As another example of the application to bouldering, the position and posture of a person on a bouldering wall can be detected. FIG. 19 is a diagram for describing another example of the third application example of the present embodiment.

As illustrated in FIG. 19, for example, a bouldering wall 59 is constructed by a member that transmits a predetermined detection wavelength (for example, acrylic that transmits IR), and a grid pattern 450 made of a retroreflective material is bonded to the front surface of the wall 59. The information processing device 10 can sense the grid pattern 450 (for example, detect by retroreflection) by using an IR projector (illumination device 300d) and an imaging device 301d, and extract a silhouette of a person from a shielding condition based on the sensing data, and hence can thereby recognize the position and posture of the person. Note that the (fixed) position of each hold 460 can be recognized from the back surface based on sensing data obtained by using an IR projector (illumination device 303d) and an imaging device 302d.

In this manner, an effect such as projection can be projected by a projector 201d depending on the position of a user and the location of a hold.

6. Hardware Configuration Example

Figure 20:
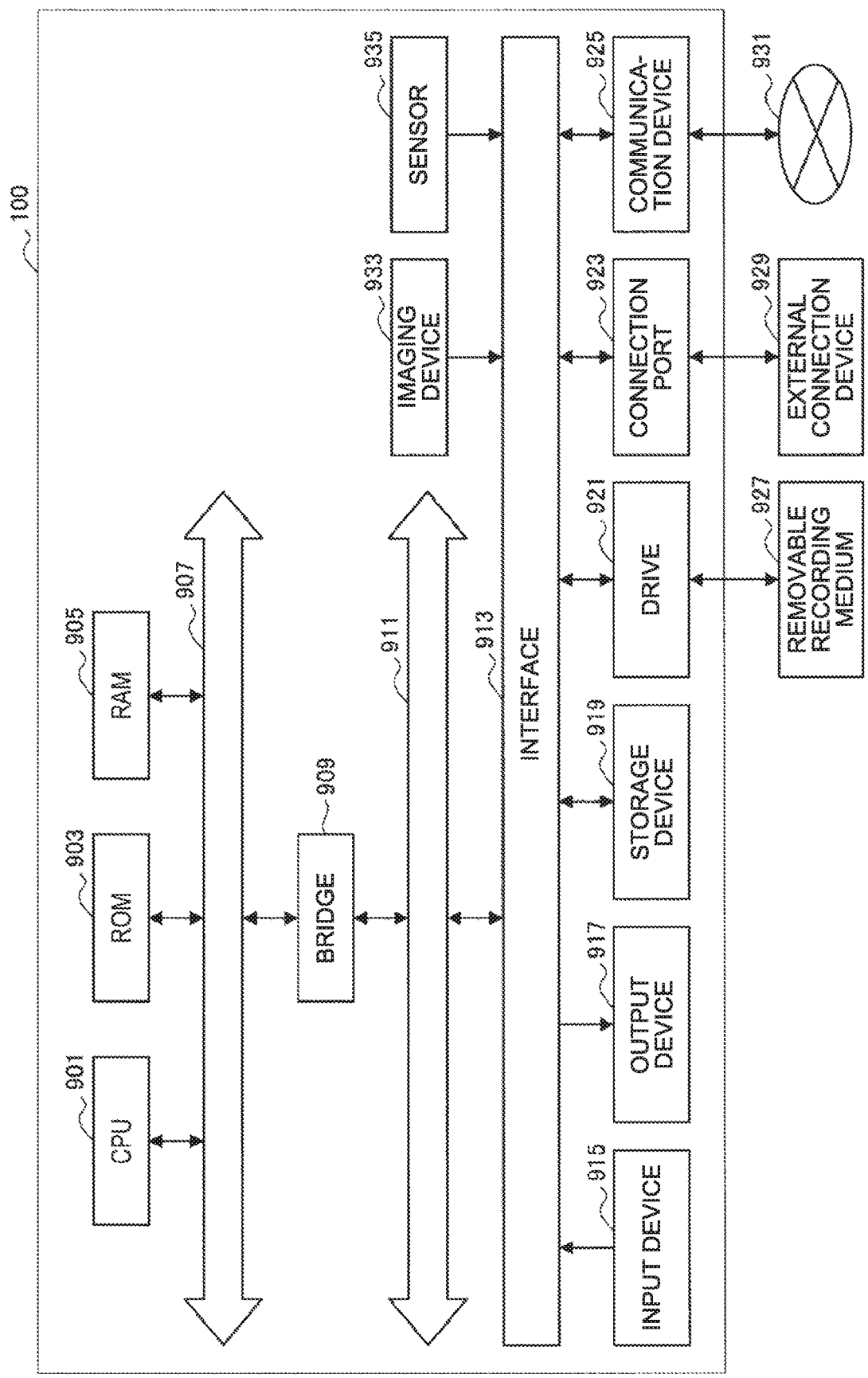
FIG. 20 is a block diagram illustrating a hardware configuration example of the information processing device according to the embodiment of the present disclosure.

Next, a hardware configuration of the information processing device 10 according to the embodiment of the present disclosure is described with reference to FIG. 20. FIG. 20 is a block diagram illustrating a hardware configuration example of the information processing device 10 according to the embodiment of the present disclosure.

As illustrated in FIG. 20, the information processing device 10 includes a central processing unit (CPU) 901, a read only memory (ROM) 903, and a random access memory (RAM) 905. The information processing device 10 may include a host bus 907, a bridge 909, an external bus 911, an interface 913, a storage device 919, a drive 921, a connection port 923, and a communication device 925. The information processing device 10 may have a processing circuit called digital signal processor (DSP) or application specific integrated circuit (ASIC) instead of or together with the CPU 901.

The CPU 901 functions as an arithmetic processing device and a control device, and controls the overall or partial operation in the information processing device 10 in accordance with various kinds of computer programs recorded in the ROM 903, the RAM 905, the storage device 919, or a removable recording medium 927. The ROM 903 stores therein computer programs and arithmetic parameters used by the CPU 901. The RAM 905 temporarily stores therein computer programs used for execution by the CPU 901 and parameters that change as appropriate in the execution. The CPU 901, the ROM 903, and the RAM 905 are mutually connected by the host bus 907 constructed by an internal bus such as a CPU bus. Furthermore, the host bus 907 is connected to the external bus 911 such as a peripheral component interconnect/interface (PCI) bus through the bridge 909.

The storage device 919 is a device for data storage configured as an example of a storage unit in the information processing device 10. For example, the storage device 919 is configured by a magnetic storage unit device such as a hard disk drive (HDD), a semiconductor storage device, an optical storage device, or a magnetooptical storage device. The storage device 919 stores therein computer programs and various kinds of data executed by the CPU 901 and various kinds of data acquired from the outside.

The drive 921 is a reader/writer for the removable recording medium 927 such as a magnetic disk, an optical disc, a magnetooptical disc, or a semiconductor memory, and is incorporated in or externally mounted to the information processing device 10. The drive 921 reads information recorded in the mounted removable recording medium 927, and outputs the information to the RAM 905. The drive 921 writes records in the mounted removable recording medium 927.

The connection port 923 is a port for directly connecting a device to the information processing device 10. For example, the connection port 923 may be a universal serial bus (USB) port, an IEEE1394 port, or a small computer system interface (SCSI) port. The connection port 923 may be an RS-232C port, an optical audio terminal, or a high-definition multimedia interface (HDMI) (trademark) port. By connecting an external connection device 929 to the connection port 923, various kinds of data may be exchanged between the information processing device 10 and the external connection device 929.

For example, the communication device 925 is a communication interface configured by a communication device for connection to a network 931. For example, the communication device 925 may be a wired or wireless local area network (LAN), Bluetooth (trademark), or a communication card for wireless USB (WUSB). The communication device 925 may be a router for optical communication, a router for asymmetric digital subscriber line (ADSL), or a modem for various kinds of communication. For example, the communication device 925 transmits and receives signals to and from the Internet and other communication devices by using a predetermined protocol such as TCP/IP. The network 931 connected to the communication device 925 is a network connected by wired or wireless connection, and is, for example, the Internet, a home LAN, infrared communication, radio communication, or satellite communication.

An example of the hardware configuration of the information processing device 10 has been described above. Each of the above-mentioned components may be configured by using a general-purpose member, or may be configured by hardware dedicated to the function of each component. The configuration may be changed as appropriate depending on the technical level for implementation.

7. Conclusion

As described above, the information processing system according to the embodiment of the present disclosure can more reliably recognize the positions of a plurality of detection targets.

While the exemplary embodiment of the present disclosure has been described above in detail with reference to the accompanying drawings, the present technology is not limited to the examples. It is obvious that a person with ordinary skills in the technical field of the present disclosure could conceive of various kinds of changes and modifications within the range of the technical concept described in the claims. It should be understood that the changes and the modifications belong to the technical scope of the present disclosure.

For example, a computer program for exhibiting the functions of the information processing device 10 may be created on hardware such as a CPU, a ROM, and a RAM incorporated in the above-mentioned information processing device 10. A computer-readable storage medium having the computer program stored thereon is provided.

The effects described herein are merely demonstrative or illustrative and are not limited. In other words, the technology according to the present disclosure could exhibit other effects obvious to a person skilled in the art from the descriptions herein together with or in place of the above-mentioned effects.

Note that the present technology can also employ the following configurations.

(1)
An information processing device, comprising a control unit for recognizing positions of a first detection target and a second detection target that are present on the same surface, wherein
the control unit is configured to:
recognize the position of the first detection target based on sensing data obtained by a first sensor for sensing the first detection target from a first direction; and
recognize the position of the second detection target based on sensing data obtained by a second sensor for sensing the second detection target from a direction opposite to the first direction across the same surface.

(2)
The information processing device according to (1), wherein a member that forms a surface on which the first detection target and the second detection target are located is a member that is located between the first sensor and the second sensor and that transmits a wavelength for detection by the second sensor.

(3)
The information processing device according to (1) or (2), wherein
the first sensor detects light reflected by a reflection material provided to the first detection target or light emitted from a light emitting unit provided to the first detection target, and
the second sensor detects light reflected by a reflection material provided to the second detection target or light emitted from a light emitting unit provided to the second detection target.

(4)
The information processing device according to (1), wherein the control unit performs collision determination to determine presence/absence of collision between the first detection target and the second detection target based on the recognized position of the first detection target and the recognized position of the second detection target.

(5)
The information processing device according to (4), wherein the control unit performs the collision determination by generating, based on a first taken image acquired by the first sensor and a second taken image acquired by the second sensor, a combined image including a position of the first detection target recognized from the first taken image and a position of the second detection target recognized from the second taken image.

(6)
The information processing device according to (5), wherein the control unit performs the collision determination based on a result of comparison between a distance between the position of the first detection target and the position of the second detection target and a predetermined threshold.

(7)
The information processing device according to (6), wherein, when the distance between the position of the first detection target and the position of the second detection target falls below the predetermined threshold, the control unit determines that the collision between the first detection target and the second detection target has occurred.

(8)
The information processing device according to any one of (4) to (7), wherein the control unit performs interaction control corresponding to the presence/absence of the collision.

(9)

The information processing device according to (8), wherein, when the collision has occurred, the control unit performs display control of at least one of the first detection target, the second detection target, and a surface on which the first detection target and the second detection target are located, voice output, or presentation of tactile sense to the first detection target or the second detection target.

(10)

The information processing device according to (8), wherein, when the second detection target has collided with the first detection target operated by a user, the control unit changes a color projected on the second detection target.

(11)

The information processing device according to (8), wherein, when the second detection target has collided with the first detection target operated by a user, the control unit changes a display size of an image projected on the second detection target.

(12)

The information processing device according to any one of (8) to 11, wherein the control unit is configured to:
determine collision between the second detection target that freely moves on a surface due to collision with the first detection target operated by a user and an outer peripheral wall on the surface, and
change, when the collision with the outer peripheral wall has occurred, at least one of a projection color to the second detection target and a display color of a movement locus of the second detection target on the surface.

(13)

The information processing device according to (12), wherein, when the second detection target has collided with the outer peripheral wall of a projection color different from a projection color of the second detection target, the control unit increases, on the surface, a region of the same projection color as the projection color of the second detection target.

(14)

The information processing device according to (8), wherein the control unit is configured to:
set a virtual collision determination region for at least one of the first detection target and the second detection target; and
clarify the virtual collision determination region by a projection image.

(15)

The information processing device according to any one of (8) to 14, wherein the control unit is configured to:
project a virtual object image that freely moves on a surface due to collision with the first detection target operated by a user onto the surface; and
change the virtual object image depending on the collision with the first detection target.

(16)

The information processing device according to (15), wherein the control unit changes a color, a size, a number, or a moving speed of the virtual object image in response to the collision with the first detection target.

(17)

The information processing device according to (15) or (16), wherein the control unit changes contents of the interaction control depending on whether the first detection target has collided with the second detection target or the virtual object image.

(18)

The information processing device according to any one of (8) to (17), wherein the control unit is configured to:
generate, in accordance with motion of the second detection target that freely moves on a surface due to collision with the first detection target operated by a user, an image on the surface; and
record a process for generating the image on the surface.

(19)

An information processing method, comprising:
recognizing, by a processor, a position of a first detection target based on sensing data obtained by a first sensor for sensing the first detection target from a first direction; and
recognizing, by the processor, a position of a second detection target based on sensing data obtained by a second sensor for sensing the second detection target present on a surface on which the first detection target is present from a direction opposite to the first direction across the surface.

(20)

A computer program for causing a computer to function as a control unit for recognizing positions of a first detection target and a second detection target that are present on the same surface, wherein
the control unit is configured to:
recognize the position of the first detection target based on sensing data obtained by a first sensor for sensing the first detection target from a first direction; and
recognize the position of the second detection target based on sensing data obtained by a second sensor for sensing the second detection target from a direction opposite to the first direction across the same surface.

REFERENCE SIGNS LIST 1 information processing system
10 information processing device
20 output device
30 input device
40 mallet
42 light emitting element
43 puck
44 reflection material
50 hockey table
110 I/F unit
120 emission recognition unit
130 management unit
131 locus management unit
132 video management unit
140 storage unit
150 coordinate transform unit
160 video generation unit
201 projector
300 illumination device
301 top camera
301a to 301d imaging device
302 bottom camera
302a to 302d imaging device
760, 770 virtual puck

The invention claimed is:

1. An information processing device, comprising a control unit configured to:
recognize positions of a first detection target and a second detection target that are present on a same surface;
recognize the position of the first detection target based on sensing data obtained by a first sensor for sensing the first detection target from a first direction;
recognize the position of the second detection target based on sensing data obtained by a second sensor for sensing the second detection target from a direction opposite to the first direction across the same surface; and perform collision determination to determine presence/absence of collision between the first detection target and the second detection target based on a distance between the position of the first detection target and the position of the second detection target, wherein the control unit is implemented via at least one processor.

2. The information processing device according to claim 1, wherein a member, which forms the same surface on which the first detection target and the second detection target are located, is located between the first sensor and the second sensor and that transmits a wavelength for detection by the second sensor.

3. The information processing device according to claim 1, wherein the first sensor detects light reflected by a reflection material provided to the first detection target or light emitted from a light emitting unit provided to the first detection target, and the second sensor detects light reflected by a reflection material provided to the second detection target or light emitted from a light emitting unit provided to the second detection target.

4. The information processing device according to claim 1, wherein the control unit is further configured to perform the collision determination by generating, based on a first taken image acquired by the first sensor and a second taken image acquired by the second sensor, a combined image including a position of the first detection target recognized from the first taken image and a position of the second detection target recognized from the second taken image.

5. The information processing device according to claim 4, wherein the control unit is further configured to perform the collision determination based on a result of a comparison between the distance between the position of the first detection target and the position of the second detection target and a predetermined threshold.

6. The information processing device according to claim 5, wherein, when the distance between the position of the first detection target and the position of the second detection target falls below the predetermined threshold, the control unit is further configured to determine that the collision between the first detection target and the second detection target has occurred.

7. The information processing device according to claim 1, wherein the control unit is further configured to perform interaction control corresponding to the presence/absence of the collision.

8. The information processing device according to claim 7, wherein, when the collision has occurred, the control unit is further configured to perform display control of at least one of the first detection target, the second detection target, and the same surface on which the first detection target and the second detection target are located, voice output, or presentation of tactile sense to the first detection target or the second detection target.

9. The information processing device according to claim 7, wherein, when the second detection target has collided with the first detection target operated by a user, the control unit is further configured to change a color projected on the second detection target.

10. The information processing device according to claim 7, wherein, when the second detection target has collided with the first detection target operated by a user, the control unit is further configured to change a display size of an image projected on the second detection target.

11. The information processing device according to claim 7, wherein the control unit is further configured to:

determine collision between the second detection target that freely moves on the same surface due to collision with the first detection target operated by a user and an outer peripheral wall on the same surface, and change, when the collision with the outer peripheral wall has occurred, at least one of a projection color to the second detection target and a display color of a movement locus of the second detection target on the same surface.

12. The information processing device according to claim 11, wherein, when the second detection target has collided with the outer peripheral wall of a projection color different from a projection color of the second detection target, the control unit is further configured to increase, on the same surface, a region of a same projection color as the projection color of the second detection target.

13. The information processing device according to claim 7, wherein the control unit is further configured to:

set a virtual collision determination region for at least one of the first detection target and the second detection target; and clarify the virtual collision determination region by a projection image.

14. The information processing device according to claim 7, wherein the control unit is further configured to:

project a virtual object image that freely moves on the same surface due to collision with the first detection target operated by a user onto the same surface; and change the virtual object image depending on the collision with the first detection target.

15. The information processing device according to claim 14, wherein the control unit is further configured to change a color, a size, a number, or a moving speed of the virtual object image in response to the collision with the first detection target.

16. The information processing device according to claim 14, wherein the control unit is further configured to change contents of the interaction control depending on whether the first detection target has collided with the second detection target or the virtual object image.

17. The information processing device according to claim 7, wherein the control unit is further configured to:

generate, in accordance with motion of the second detection target that freely moves on the same surface due to collision with the first detection target operated by a user, an image on the same surface; and record a process for generating the image on the same surface.

18. An information processing method, comprising:

recognizing, by a processor, positions of a first detection target and a second detection target that are present on a same surface, wherein the recognition of the position of the first detection target and the second detection target includes:

recognizing, by the processor, the position of the first detection target based on sensing data obtained by a first sensor for sensing the first detection target from a first direction;

recognizing, by the processor, the position of the second detection target based on sensing data obtained by a second sensor for sensing the second detection target from a direction opposite to the first direction across the same surface; and performing, by the processor, collision determination to determine presence/absence of collision between the first detection target and the second detection target based on a distance between the position of the first detection target and the position of the second detection target.

19. A non-transitory computer-readable medium having embodied thereon a program, which when executed by computer causes the computer to execute an information processing method, the method comprising:

recognizing positions of a first detection target and a second detection target that are present on a same surface, wherein the recognition of the position of the first detection target and the second detection target includes:

recognizing the position of the first detection target based on sensing data obtained by a first sensor for sensing the first detection target from a first direction; and recognizing the position of the second detection target based on sensing data obtained by a second sensor for sensing the second detection target from a direction opposite to the first direction across the same surface; and performing collision determination to determine presence/absence of collision between the first detection target and the second detection target based on a distance between the position of the first detection target and the position of the second detection target.

\* \* \* \* \*